United States Patent
Amirijoo et al.

(10) Patent No.: US 9,992,720 B2
(45) Date of Patent: Jun. 5, 2018

(54) METHODS AND ARRANGEMENTS FOR IDENTIFYING A NEIGHBOURING BASE STATION

(75) Inventors: Mehdi Amirijoo, Linköping (SE); Pål Frenger, Linköping (SE); Fredrik Gunnarsson, Linköping (SE); Johan Moe, Mantorp (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days. days.

(21) Appl. No.: 14/361,586

(22) PCT Filed: Dec. 20, 2011

(86) PCT No.: PCT/SE2011/051545
§ 371 (c)(1),
(2), (4) Date: May 29, 2014

(87) PCT Pub. No.: WO2013/095219
PCT Pub. Date: Jun. 27, 2013

(65) Prior Publication Data
US 2014/0308958 A1   Oct. 16, 2014

(51) Int. Cl.
*H04W 36/08* (2009.01)
*H04W 36/00* (2009.01)
(52) U.S. Cl.
CPC ....... *H04W 36/08* (2013.01); *H04W 36/0061* (2013.01); *H04W 36/0083* (2013.01)
(58) Field of Classification Search
CPC ............. H04W 36/0011; H04W 36/06; H04W 72/0426; H04W 36/08; H04W 4/00; H04W 4/06
See application file for complete search history.

(56) References Cited

U.S. PATENT DOCUMENTS 6,125,280 A * 9/2000 Grandhi ................ H04W 24/02
                                                                455/446
2006/0140135 A1   6/2006 Bonta et al.
(Continued)

FOREIGN PATENT DOCUMENTS

EP    2709397 A2    3/2014
WO    2009110730 A2   9/2009
(Continued)

OTHER PUBLICATIONS

"Evaluations of LTE Automatic Neighbor Relations" Anders Dahlén, Arne Johansson TeliaSonera; Stockholm, Sweden; 2011.*
(Continued)

*Primary Examiner* — Mehmood B. Khan
*Assistant Examiner* — Dung Lam
(74) *Attorney, Agent, or Firm* — Patent Portfolio Builders, PLLC

(57) ABSTRACT

A method in a base station (110) for enabling the base station (110) to identify a neighboring base station (120) is provided. A request is being sent (303) to a user equipment (130), commanding it to send an identification requesting message to the neighboring base station (120). In response to reception of the sent identification requesting message, a neighboring base station identifier that is associated with and identifies the neighboring base station (120), is received (303). Thereby the base station (110) is enabled to identify the neighboring base station (120). By receipt of the neighboring base station identifier, the base station becomes aware of and is enabled to contact, or connect with, the neighboring base station more directly, without the need of doing it through the user equipment. This can be done at some later point in time, for example in order to request the neighboring base station to perform handover measurements with regard to the same or another user equipment.

11 Claims, 15 Drawing Sheets

(56) References Cited

U.S. PATENT DOCUMENTS

| | | | |
|---|---|---|---|
| 2007/0010251 A1* | 1/2007 | Cho | H04W 36/0055 |
| | | | 455/436 |
| 2007/0086388 A1* | 4/2007 | Kang | H04W 36/30 |
| | | | 370/331 |
| 2008/0207207 A1 | 8/2008 | Moe et al. | |
| 2008/0311914 A1* | 12/2008 | Innakornsrisuphap | H04W 36/0083 |
| | | | 455/436 |
| 2009/0129291 A1 | 5/2009 | Gupta et al. | |
| 2009/0247159 A1* | 10/2009 | Flore | H04W 24/02 |
| | | | 455/434 |
| 2011/0065431 A1 | 3/2011 | Neil | |
| 2011/0070897 A1* | 3/2011 | Tang | H04W 24/02 |
| | | | 455/456.1 |
| 2012/0009949 A1* | 1/2012 | Islam | H04W 64/00 |
| | | | 455/456.6 |

FOREIGN PATENT DOCUMENTS

| | | | | |
|---|---|---|---|---|
| WO | 2013006105 A1 | 7/2011 | | |
| WO | WO 2011147375 A2 * | 12/2011 | | H04W 16/32 |

OTHER PUBLICATIONS

Godór, I., et al., "Most Promising Tracks of Green Network Technologies", Seventh Framework Programme, Energy Aware Radio and Network Technologies, Dec. 31, 2010, pp. 1-116, INFSO-ICT-247733 Earth, Deliverable D3.1, version 1.0.

3rd Generation Partnership Project, "3rd Generation Partnership Project; Technical Specification Group Radio Access Network; Evolved Universal Terrestrial Radio Access (E-UTRA) and Evolved Universal Terrestrial Radio Acess Network (E-UTRAN); Overall description; Stage 2 (Release 10)", Technical Specification, 3GPP TS 36.300 V10.5.0, Sep. 1, 2011, pp. 1-194, 3GPP, France.

Office Action in EP application No. 11877741.6 dated Oct. 2, 2015.

Qualcomm Europe "Inter-RAT/frequency Automatic Neighbour Relation Function," 3GPP TSG-RAN WG3 Meeting #58, R3-072117, XP050019355, Oct. 30, 2007, pp. 1-6.

Office Action in EP application No. 11877741.6 dated Aug. 18, 2016.

* cited by examiner

METHODS AND ARRANGEMENTS FOR IDENTIFYING A NEIGHBOURING BASE STATION

TECHNICAL FIELD

Embodiments herein relate to a base station, a method in a base station, a user equipment, a method in a user equipment, a neighbouring base station, a method in a neighbouring base station, a management entity and a method in a management entity. In particular, embodiments herein relate to identifying a neighbouring base station.

BACKGROUND

Communication devices such as User Equipments (UE) are also known as e.g. mobile terminals, wireless terminals and/or mobile stations. A user equipment is enabled to communicate wirelessly in a cellular communications network, wireless communications system, or radio communications system, sometimes also referred to as a cellular radio system or cellular networks. The communication may be performed e.g. between two user equipments, between a user equipment and a regular telephone and/or between a user equipment and a server via a Radio Access Network (RAN) and possibly one or more core networks, comprised within the cellular communications network.

The user equipment may further be referred to as a mobile telephone, cellular telephone, laptop, Personal Digital Assistant (PDA), tablet computer, surf plate, just to mention some further examples. The user equipment in the present context may be, for example, portable, pocket-storable, hand-held, computer-comprised, or vehicle-mounted mobile devices, enabled to communicate voice and/or data, via the RAN, with another entity, such as another user equipment or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipment within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

In the context of this disclosure, the expression downlink (DL) is used for the transmission path from the base station to the user equipment. The expression uplink (UL) is used for the transmission path in the opposite direction i.e. from the user equipment to the base station.

By handover is commonly referred to the procedure of transferring a user equipment being served by a base station to instead be served by another base station. A serving base station is the base station the user equipment is connected to for communication of user data and services. Handover measurements are used to determine which other base station to make handover to. Handover measurements in conventional cellular systems are based on user equipment measurements on downlink pilot signals. Quantities measured are typically different means of signal strength (e.g. RSRP, Reference Signal Received Power) and signal quality (e.g. RSRQ, Reference Signal Received Quality). Each user equipment measures on signals sent from neighbouring base stations, and compares with the corresponding downlink pilot signal received from the serving base station. Neighbouring base station here refers to a base station that is neighbouring in relation to a base station, and more specifically that the neighbouring base station is located so that it has overlapping radio coverage with the base station and thereby may be a handover candidate for a user equipment being served by the base station.

However, the conventional handover procedure will not always be suitable, or possible, to use and there are of different reasons desirable to be able to support also other handover procedures, in particular such where handover measurements are to be performed by a neighbouring base station on a reference signal from a user equipment.

SUMMARY

It is therefore an object of embodiments herein to enable support for systems where handover measurements are to be performed by a neighbouring base station, or neighbouring base stations.

According to a first aspect of embodiments herein, the object is achieved by a method in a base station for enabling the base station to identify a neighbouring base station. The base station and the neighbouring base station are comprised in a radio communications system. The base station sends to a user equipment, a request that commands the user equipment to send an identification requesting message to the neighbouring base station. The base station then receives from the neighbouring base station, in response to reception of the sent identification requesting message, a neighbouring base station identifier. The neighbouring base station identifier is associated with and identifies the neighbouring base station, thereby enabling the base station to identify the neighbouring base station.

Neighbouring base station herein refers to a base station that is neighbouring in relation to the base station, and more specifically that the neighbouring base station is located so that it has overlapping radio coverage with the base station and thereby may be a handover candidate for a user equipment being served by the base station.

According to a second aspect of embodiments herein, the object is achieved by a method in a user equipment for assisting in enabling a base station identify a neighbouring base station. The base station and the neighbouring base station are comprised in a radio communications system. The user equipment receives from the base station, a request that commands the user equipment to send an identification requesting message to the neighbouring base station. The user equipment then sends the identification requesting message to the neighbouring base station using the base station identifier. The identification requesting message comprises a base station identifier that is associated with and identifies the base station and thereby enables the neighbouring base station to contact the base station.

According to a third aspect of embodiments herein, the object is achieved by a method in a neighbouring base station for enabling a base station to identify the neighbouring base station. The base station and the neighbouring base station are comprised in a radio communications system. The neighbouring base station receives from a user equipment, an identification requesting message, and sends to the base station, in response to reception of the identification requesting message, a neighbouring base station identifier. The neighbouring base station identifier is associated with and identifies the neighbouring base station, thereby enabling the base station to identify the neighbouring base station.

According to a fourth aspect of embodiments herein, the object is achieved by a method in a management entity for assisting in enabling a base station to identify a neighbouring base station. The base station, the neighbouring base station and the management entity being comprised in a radio communications system. The management entity receives from the base station, a request that commands the management entity to send a listening request to potential neighbouring base stations including the neighbouring base station. The listening request commands the potential neighbouring base stations to listen for an identification requesting message. The management entity accordingly sends the listening request to the potential neighbouring base stations.

According to a fifth aspect of embodiments herein, the object is achieved by a base station for enabling a base station to identify a neighbouring base station. The base station and the neighbouring base station being configured to be comprised in a radio communications system. The base station comprises a sending port configured to send to the user equipment, a request that commands the user equipment to send an identification requesting message to the neighbouring base station. The base station further comprises a receiving port configured to receive from the neighbouring base station, in response to reception of the sent identification requesting message, a neighbouring base station identifier. The neighbouring base station identifier is associated with and identifies the neighbouring base station, thereby enabling the base station to identify the neighbouring base station.

According to a sixth aspect of embodiments herein, the object is achieved by a user equipment for assisting in enabling a base station to identify a neighbouring base station. The base station and the neighbouring base station being comprised in a radio communications system. The user equipment comprises a receiving port configured to receive from the base station a request that commands the user equipment (to send an identification requesting message to the neighbouring base station. The user equipment further comprises a sending port configured to send the identification requesting message to the neighbouring base station.

According to a seventh aspect of embodiments herein, the object is achieved by a neighbouring base station for enabling a base station to send information to the neighbouring base station. The base station and the neighbouring base station being comprised in a radio communications system. The neighbouring base station a receiving port configured to receive from a user equipment an identification requesting message, and a sending port configured to send to the base station, in response to reception of the identification requesting message, a neighbouring base station identifier. The neighbouring base station identifier is associated with and identifies the neighbouring base station, thereby enabling the base station to identify the neighbouring base station.

According to an eighth aspect of embodiments herein, the object is achieved by a management entity for assisting in enabling a base station to identify a neighbouring base station. The base station, the neighbouring base station and the management entity is comprised in a radio communications system. The management entity comprises a receiving port configured to receive from the base station, a request that commands the management entity to send a listening request to potential neighbouring base stations including the neighbouring base station. The listening request commands the potential neighbouring base stations to listen for an identification requesting message. The management entity further comprises a sending port configured to send the listening request to the potential neighbouring base stations.

Although a base station may not be initially aware of what other base stations are neighbouring, it will nevertheless be able to reach a neighbouring base station indirectly through a user equipment. According to the aspects above this is utilized through the request sent to the user equipment, resulting in that the user equipment is sending the identification requesting message. Any other base station receiving this message must be a neighbouring base station since the only other base station, or other base stations, that can be reached by the user equipment, is such that has overlapping radio coverage with the base station at the location of the user equipment. When the neighbouring base station, in response to the identification requesting message, has sent the neighbouring base station identifier and it has been received by the base station, the base station has identified, and thus become aware of, the neighbouring base station. This enables the base station to contact, or connect with, the neighbouring base station more directly, without the need of doing it through the user equipment. Such contact, or connection, with the neighbouring base station can be done at some later point in time, for example in order to request the neighbouring base station to perform handover measurements in regard of the same or another user equipment. Embodiments herein thus enable support for systems where handover measurements are to be performed by a neighbouring base station, and in particular when such measurements are to be requested in advance by the base station currently serving the user equipment subject to the handover.

Further advantages with embodiments herein involve:

Support for self-organizing networks since the base station may itself initialize and identify neighbouring base stations and thus be able to keep up to date which base stations are candidates for handover.

Compatibility with the concept of dynamic cells described below, where a cell can be tailored to suit the needs of currently active user equipment.

Network energy saving, since base stations according to embodiments herein are not required to continuously send their identity in the form of the neighbouring base station identifier.

BRIEF DESCRIPTION OF THE DRAWINGS

Examples of embodiments herein are described in more detail with reference to the appended schematic drawings, in which.

DESCRIPTION

Figure 1:
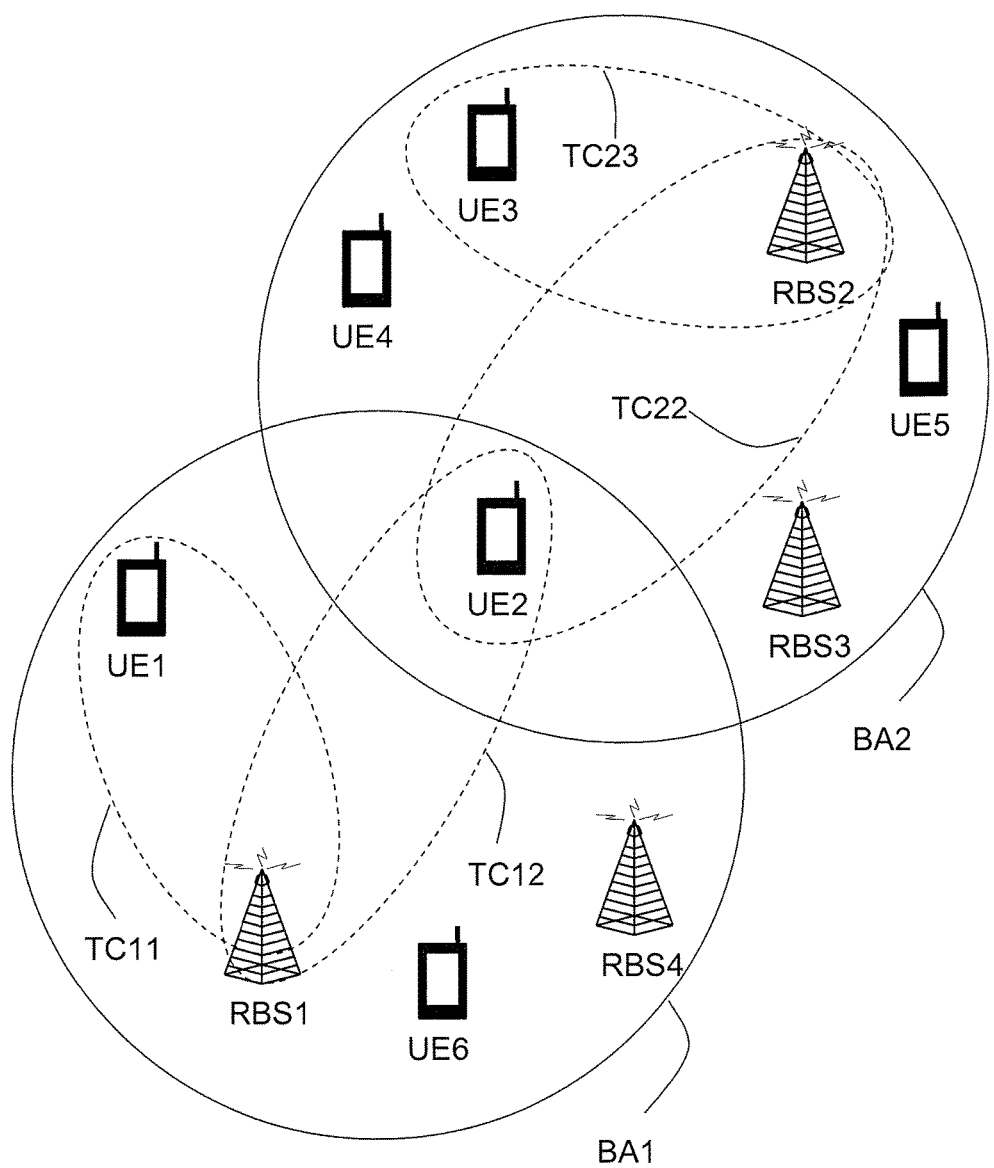
FIG. 1 is a schematic block diagram illustrating a radio communications system.

As part of the development towards embodiments herein, the problem indicated in the background section will first be further discussed, with reference to FIG. 1.

A cell in a radio communication system is traditionally defined as the coverage area of the system broadcast channel. So far in all 3GPP systems, that is, systems pertaining to GSM, LTE and HSPA (High Speed Packet Access), the coverage area of the data channels is identical to the coverage area of the system broadcast channel. However, as the performance of current systems is to be improved with novel features such as CoMP (Coordinated Multi-Point transmission and reception), multi-carrier, and multi-hop support, this coupling between system information and data coverage becomes increasingly unmotivated. There are several problems associated with this coupling: Support for self optimizing networks is limited; energy is wasted in the network; support for advanced antenna techniques becomes limited; and high interference also during low load limits performance.

There is need to broadcast system information in cellular systems since in-active user equipments must be provided with information on how they can access the system. An in-active user equipment typically needs at least the following support from the network: system information, reference signals for user equipment measurements, and system presence detection.

However, in general there is no need to tie a connection establishment procedure, sometimes referred to as random access procedure, to a single cell before the user equipment has even contacted the network. Consequently, distribution of system information can be efficiently solved if viewed upon as a broadcast problem. In OFDM (Orthogonal Frequency Division Multiplexing) based systems, such as LTE, a solution to provide broadcast services may be to make use of single frequency network transmission techniques.

A cellular system is exemplified in the schematic drawing shown in FIG. 1. User equipment, UE1 . . . UE6, receive system information from broadcast channels, illustrated as broadcast areas, BA1 and BA2, of radio base stations RBS1 and RBS2 respectively. Each BA being defined as the radio coverage area of the respective system information broadcast channel. Active user equipment (UE1, UE2, UE3) communicate with the system through the radio base stations RBS1, RBS2 and respective tailored cells, TC11, TC12, TC22, that have been set up specifically tailored, or adapted, for their respective active user equipment. The TC enumeration concerns the relation of respective cell to the RBS and UE involved in the cell. A decision to set up, for example a CoMP cell for UE2 and a MIMO (Multiple Input Multiple Output) cell for UE1, may now, for example take into account a specific amount of traffic that UE1 and UE2 want or need to communicate. Conventionally the coverage area of the system broadcast channel defines a cell. It should be noted that many network nodes, sectors, and antenna elements may contribute in the transmission of the system broadcast channel that defines one BA. A cellular system of this type may be referred to as a system with dynamic cells, referring to the tailored cells and their dynamic nature.

As already mentioned in the background, handover measurements in conventional cellular systems are based on user equipment measurements on downlink pilot signals. Each user equipment measures on signals sent from neighbouring base stations, and compares with the corresponding downlink pilot signal received from the serving base station of the user equipment. In systems with dynamic cells, tailored for each user equipment, as described above, only downlink reference signals are not sufficient in a handover situation. In particular are downlink handover measurements on a neighbouring base station difficult since there is no dynamically created cell before the handover has occurred. Solutions to this problem may involve utilizing also uplink reference signals, where neighbouring base stations are expected to perform uplink measurements on reference signals sent from the user equipment and report these measurements to the serving base station. It would be the responsibility of the serving base station to request these measurements from the neighbouring base stations when they are needed and to coordinate them with the corresponding transmission of a suitable uplink reference signal from the user equipment. Neighbouring base stations should be aware of when the user equipment is to send the uplink reference signal.

Note that a base station may have knowledge about and be able to contact neighbour base stations, but this is not the same as having knowledge of which ones are neighbouring in the sense of having overlapping radio coverage with the base station.

The serving base station should thus be able to identify and contact neighbouring base stations. However, in connection with handover in conventional systems, there is no need for the serving base station to be aware of which base stations that are neighbouring base stations, and there is consequently no support in conventional systems for a base station to find out, or identify, which base stations that are neighbouring in order to be able to request measurements from these base stations.

Hence, to support a system with dynamically created cells as described above, or any other system where it is beneficial, or required, to perform handover measurements by a neighbouring base station on request by the serving base station, the serving base station should be able to send information to the neighbouring base station. This in turn requires that the serving base station should be able to identify the neighbouring base station, both as actually being a neighbouring one and to such extent that it can address and send information to the neighbouring base station.

Figure 2:
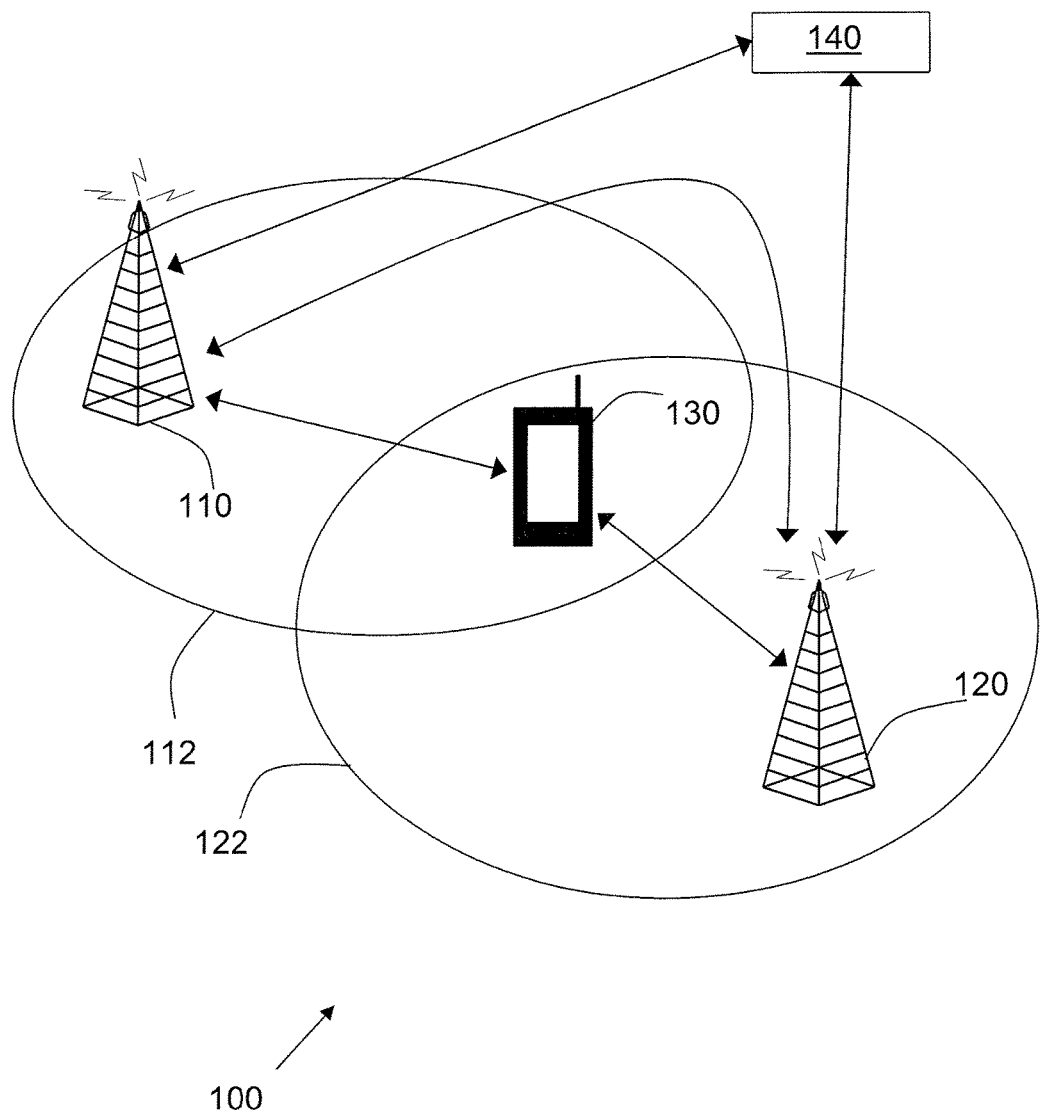
FIG. 2 is a schematic block diagram showing embodiments in a radio communications system.

FIG. 2 schematically depicts an example of a radio communications system 100, which may be an LTE cellular network. The radio communications system 100 may comprise a radio access network and a core network. In an LTE-based or related system, the radio access network may correspond to what commonly is referred to as the Evolved UMTS Terrestrial Radio Access Network (E-UTRAN) and the core network may correspond to what commonly is referred to as the Evolved Packet Core (EPC).

The shown radio communications system 100 comprises a base station 110 serving a cell 112 and a neighbouring base station 120 serving a cell 122. By a base station serving a cell is here meant the ability to wirelessly send downlink data and/or receiving uplink data via radio communication in the cell to a user equipment comprised therein. By neighbouring base station 120 is meant that it is neighbouring in relation to the base station 110, and more specifically that the neighbouring base station 120 is located so that it has overlapping radio coverage with the base station 110 and thereby may be a handover candidate for a user equipment being served by the base station.

The base station 110 and the neighbouring base station 120 may be a respective eNodeB, but may in other embodiments be of another type and/or be referred to by different names, such as RBS, NodeB, eNB, BTS, depending on technology and terminology used. In case of a situation as discussed above with dynamic cells and separation of system information and packet/user data using a respective broadcast channel and tailored cell, each one of the cells 112, 122 would typically correspond to a respective broadcast channel BA. When the radio communications system 100 comprises a radio access network and a core network, the base station 110 and the neighbouring base station 120 are typically comprised in and can receive and send information to user equipment over the radio access network and to each other and other base stations over the core network.

The shown radio communications system 100 further comprises a user equipment 130. The user equipment 130 is located within both cells 112, 122, and may thus be served by either one of the base station 110 and the neighbouring base station 120. However, in examples to follow it will be assumed that the user equipment 130 is being served by the base station 110 and that the neighbouring base station 120 thus is a candidate for handover. When the radio communications system 100 comprises a radio access network and a core network, the user equipment 130 is typically comprised in and can receive and send information over the radio access network.

The radio communications system 100 may further comprise a management entity 140. The management entity 140 is associated with the radio communications system 100 and has knowledge of and is able to contact base stations comprised therein, including the base station 110 and the neighbouring base station 120. In some embodiments the management entity may be integrated or located with a base station. In case of an LTE-based or related system, the management entity may be a device, for example a server, that implements functionality pertaining to what is commonly referred to as Domain Management (DM) and/or Network Management System (NMS). When the radio communications system 100 comprises a radio access network and a core network, the management entity 140 is typically comprised in and arranged to receive and send information over the core network.

It should be understood that FIG. 2 is merely schematic and that the radio communications system 100 in reality may comprise several further base stations, user equipment, and other network nodes, including management entities, which are not shown in the FIG. 2.

Figure 3:
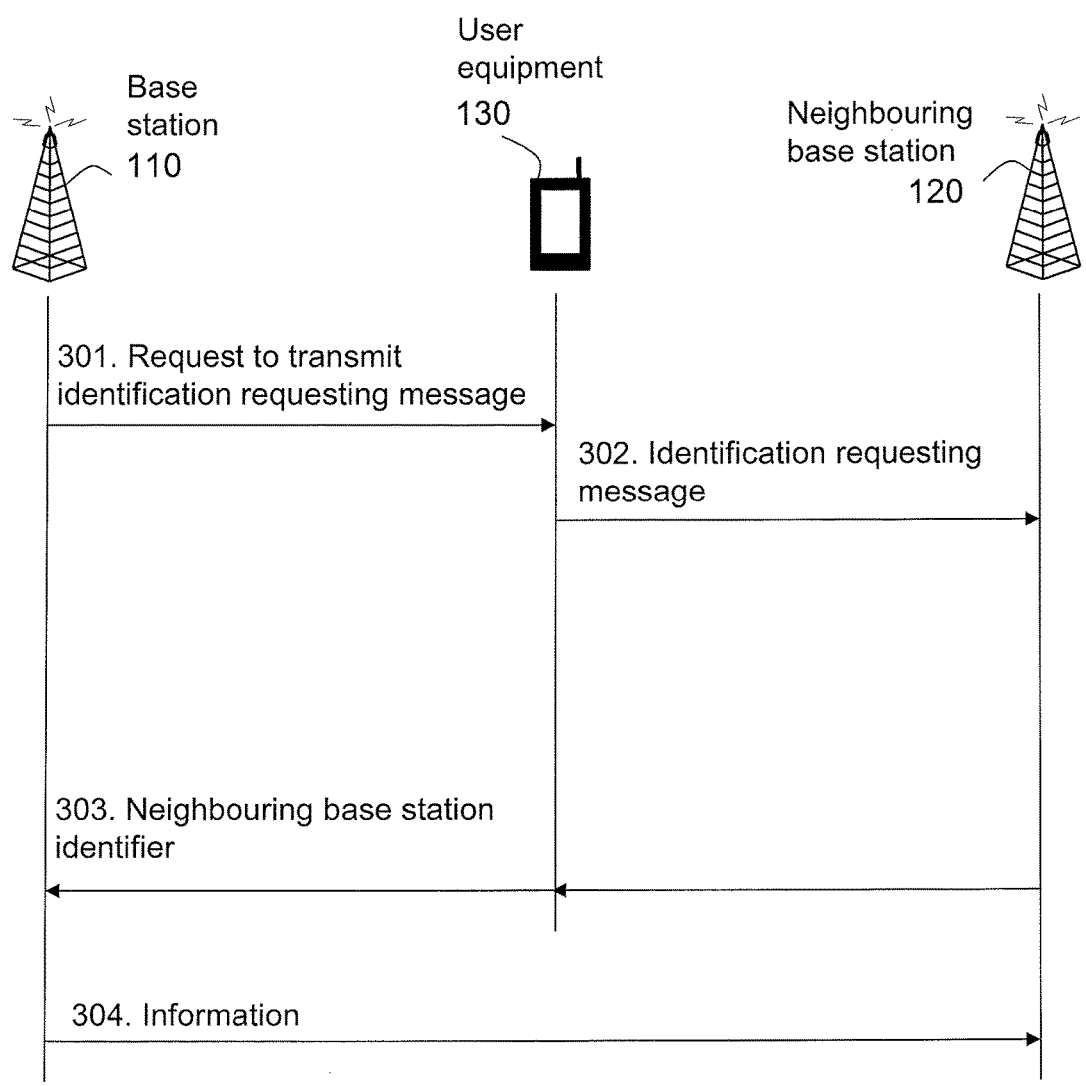
FIG. 3 is a combined signalling scheme and flowchart depicting embodiments according to a general type.

Embodiments herein for enabling a base station 110 to send information to the neighbouring base station 120, according to a general type of embodiments will now be described with reference to the combined signaling diagram and flowchart depicted in FIG. 3.

Action 301

In order to identify the neighbouring base station 120 and be enabled to send information to it, the base station 110 sends a request to the user equipment 130. The request commands the user equipment 130 to send an identification requesting message. It is here utilized that a neighbouring base station to a base station can be reached through a user equipment.

In LTE based systems, the request may for example be sent using the RRC (Radio Resource Control) or MAC (Medium Access Protocol) protocols.

What may trigger the base station 110 to send the request and what may have determined that the base station 110 should send the request, is discussed separately below.

Action 302

In response to the received request, the user equipment 130 sends and the neighbouring base station 120 receives the identification requesting message.

The identification requesting message may be sent at predetermined time intervals during which base stations, including the neighbouring base station 120, are configured to listen for such message.

Moreover, the identification requesting message may be predetermined, or at least the message may be identifiable by and have known meaning to the neighbouring base station 120. The identification requesting message may comprise a synchronization part and a data part. When a base station identifier, as will be discussed below, is sent together with the request, it may be comprised in the data part. The data part may be encoded using CDMA in order to allow separation of multiple user equipment sending at the same time and using the same frequency resource.

In LTE-based systems, the identification requesting message may for example be sent using sounding reference signal, random access preamble, or any CDMA encoded signal.

When the neighbouring base station 120 receives the identification requesting message, this means that it actually is neighbouring to the base station 110, since the user equipment 130 apparently has been able to communicate wirelessly with both. The user equipment 130 need not be aware if there actually is any base station present that is neighbouring when sending out the identification requesting message. The user equipment 130 may broadcast the identification requesting message.

Action 303

In response to receipt of the identification requesting message, the neighbouring base station 120 sends, and the base station 110, receives a neighbouring base station identifier. The neighbouring base station identifier is associated with and identifies the neighbouring base station 120.

In some embodiments, the neighbouring base station identifier comprises an identity code that is globally unique for the purpose of identifying base stations, or at least is unique in the radio communications system 100, or in a network therein, such as the core network. Using a globally unique identity code may be preferred since it facilitate, or even enable, compatibility between radio communications systems controlled by different operators. In LTE, the globally unique identity code may correspond to the E-UTRAN Cell Global Identifier (ECGI) used to identify cells globally. The ECGI is constructed from the PLMN identity (Public Land Mobile Network identity) that the cell belongs to and the Cell Identity (CI) of the cell. Note that also other globally unique identity codes may be used in case of LTE, and for embodiments herein in general.

In some embodiments, the neighbouring base station identifier comprises an identity code that as such can be used to send information to the neighbouring base station 120, for example by being an address, such as an IP-address of the base station 120 in the radio communications system 100. However, in some embodiments it is instead used a type of identity code that as such cannot be used to send information. Such identity code may then be used to look-up an address in the radio communications system 100, or a network therein, such as the core network, which address in turn can be used to send information to the neighbouring base station 120. For example, when the identity code is globally unique, a look-up address need only be locally unique, such as unique in the radio communications system 100.

The neighbouring base station identifier may be sent via the user equipment 130, or to the base station 110 without involving the user equipment 130. In the latter case, a base station identifier must first have been delivered to the neighbouring base station 120. The base station identifier may be of any of the variants discussed above for the neighbouring base station identifier, but for the purpose of instead identifying the base station 110. Note that the identifiers need not be of the same type, for example a globally unique, non-address, value may be used for the neighbouring base station identifier, and the other type of identity code, for example an IP-address, may be used for the base station identifier.

Situations where the neighbouring base station identifier is sent using a base station identifier will be further discussed below in connection with a first and second type of embodiments.

A situation where the neighbouring base station identifier is sent via the user equipment 130 will be further discussed below in connection with a third type of embodiments.

Regardless the pathway of the neighbouring base station identifier, the result is that the base station 110 receives the neighbouring base station identifier. By receipt of the neighbouring base station identifier, the base station 110 becomes informed about and is enabled to send information to the neighbouring base station 120. For example, the neighbouring base station identifier may enable the base station 110 to address and send information to the neighbouring base station 120 in the radio communications system 100, or a network therein.

When the neighbouring base station 110 receives the identification requesting message and is in possession of a base station identifier, the neighbouring base station 110 may perform a check whether the neighbouring base station 110 is already known by the base station 110, which for example may be concluded if the neighbouring base station 120 already has a connection established with the base station 110. If it is already known, there is no need to send the neighbouring base station identifier in response to the identification requesting message. Such handling has the advantage that unnecessary signaling can be avoided.

Action 304

The base station 110 here uses the received neighbouring base station identifier to send information to the neighbouring base station 120. The information being sent may, at least to begin with, be part of establishing connection between the base station 110 and the neighbouring base station 120. Information sent to the neighbouring base station 120 may also, for example following an established connection, be a request to perform handover measurements on a user equipment that may be the same or another user equipment than the user equipment 130. Such handover measurement request, or requests, may be sent when appropriate and needed at any later point in time.

Figure 4:
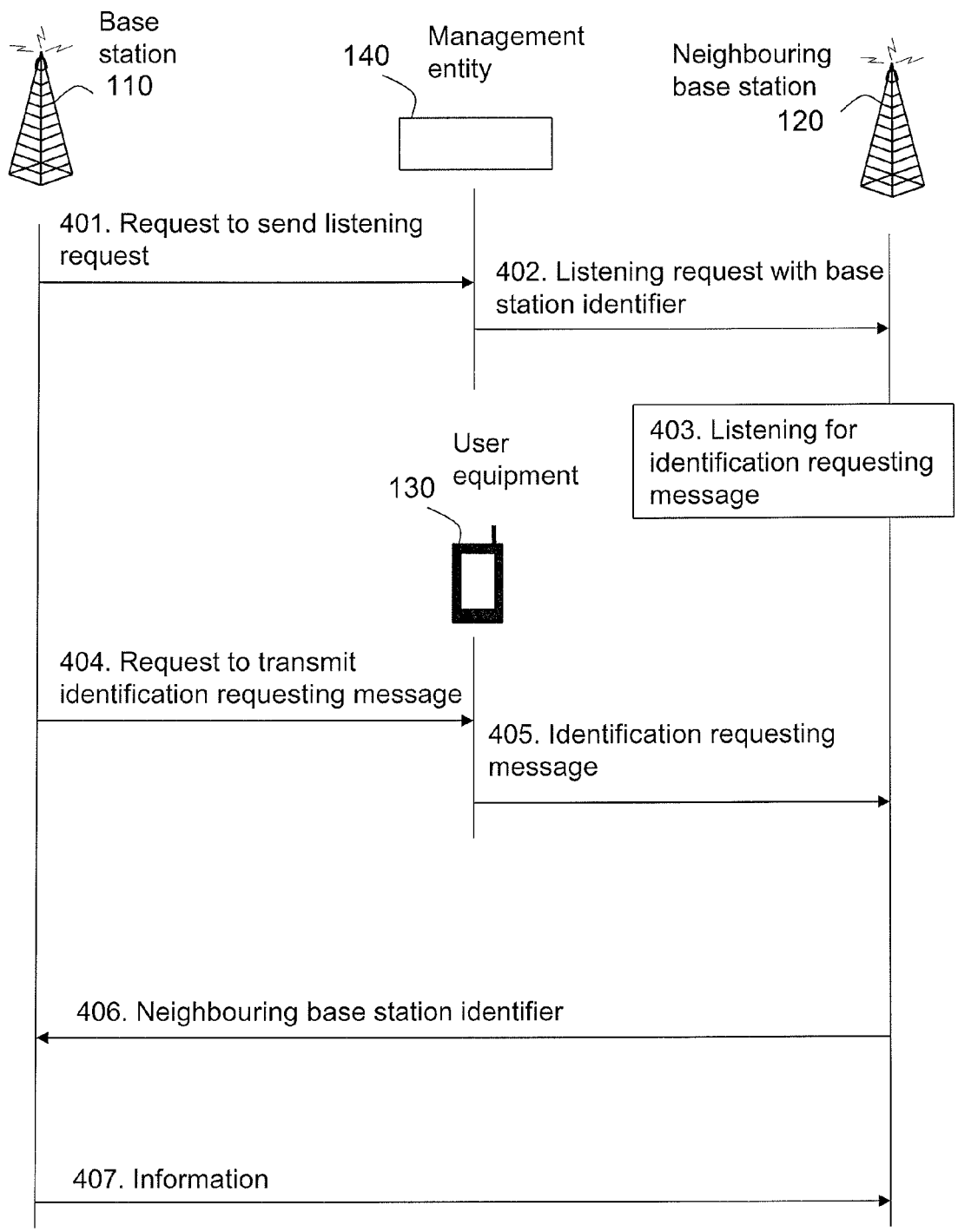
FIG. 4 is a combined signalling scheme and flowchart depicting embodiments in further detail according to a first type.

Embodiments herein for enabling a base station 110 to send information to the neighbouring base station 120, according to a first type of embodiments will now be described with reference to the combined signaling diagram and flowchart depicted in FIG. 4. The first type of embodiments may be viewed upon as somewhat more detailed embodiments than described above in connection with the general type of embodiments and FIG. 3. In the following focus will primarily be on information that differs from what have already been discussed.

Figure 5:
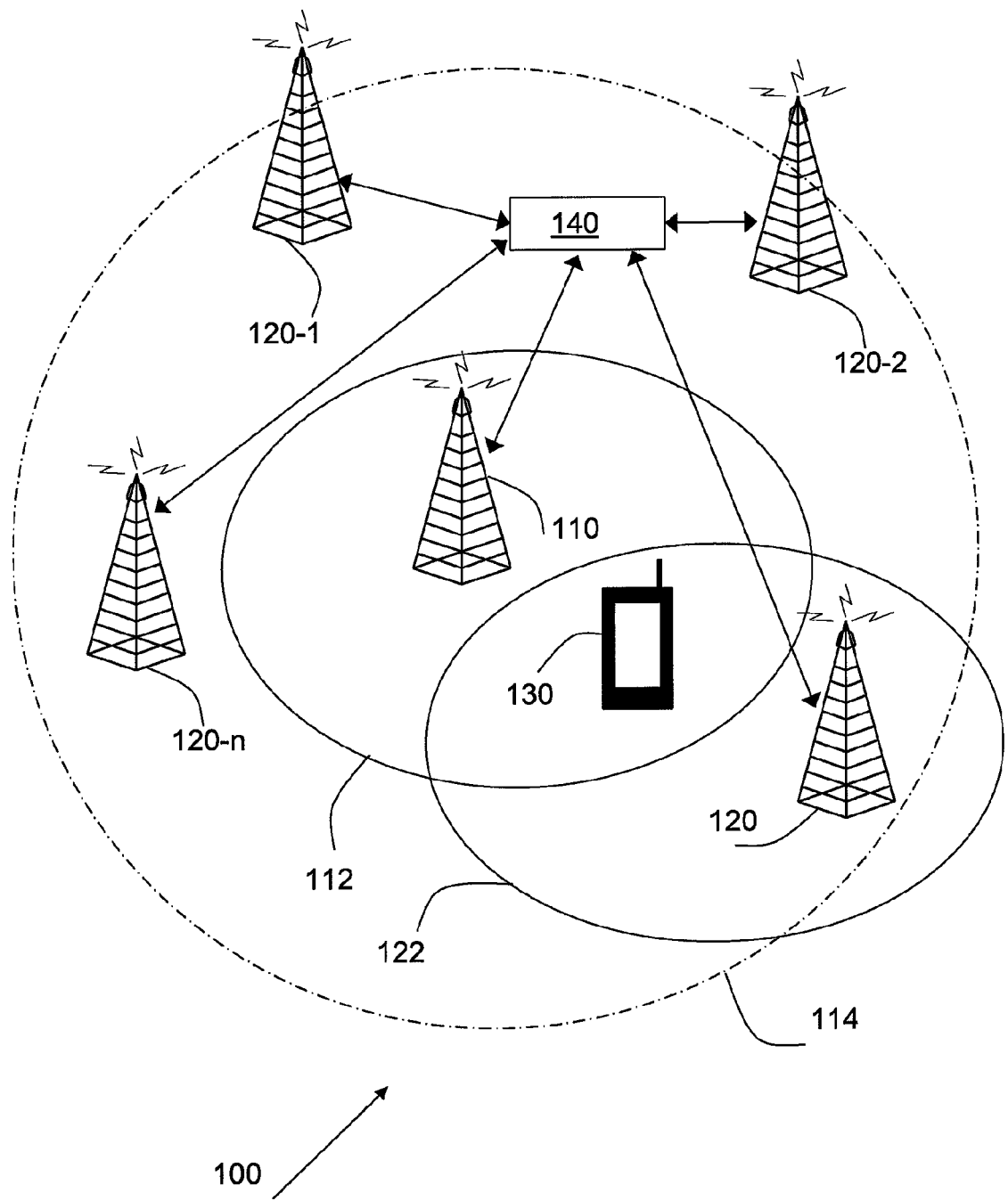
FIG. 5 is a schematic block diagram showing embodiments in a further detailed radio communications system.

For better understanding of the first type of embodiments, additional reference is made to FIG. 5. In FIG. 5, the radio communications system 100 comprising the base station 110, the neighbouring base station 120, with respective cells 112, 122, the user equipment 130 and the management entity 140, as shown in FIG. 2, is depicted also with additional base stations 120-1, 120-2, 120-n. The additional base stations and the neighbouring base stations are located in a neighborhood, or proximity, of the base station 110, exemplified in FIG. 5 by a boundary 114 and the base stations located inside. The neighborhood includes any base station that potentially may be neighbouring base station, which in FIG. 5 is illustrated by the additional base stations 120-1, 120-2, 120-n and the neighbouring base station 120, which all are located within the boundary 114. The boundary 114 may be selected a sufficient distance away from the base station 110 so that only such base stations that theoretically can be neighbouring are within the boundary 114. The boundary 114 may be selected with some margin to be sure to accomplish this, but selecting a too great boundary 114 and including base stations that not even theoretically can be neighbouring, serves no purpose and may instead result in unnecessary and excess signaling, as should be understood in view of the following.

Action 401

In order to prepare, or pre-inform, the neighbouring base station 120 for or about an upcoming identification requesting message, the base station 110 sends a request to the management entity 140. The request commands the management entity 140 to send a listening request to every base station that potentially can be a neighbouring base station, which is further elaborated upon below under action 402.

The request also, explicitly or implicitly, commands the management entity to deliver a base station identifier of the base station 110 together with the listening request. The base station identifier may be such as discussed above under Action 303 and may be included in the request sent to the management entity 140. However, in some embodiments the base station identifier to be sent may already be known to, or can be found by, the management entity 140 by using information in the request. For example, if the request is sent to the management entity over an IP-based network, the IP-address of the base station 110 will typically be available to the management entity 140 and can be used as the base station identifier or be used by the management entity 140 to find the base station identifier. In the following it is assumed that the base station identifier comprises an identity code that as such can be used to send information to the base station 110, for example that the identity code is an address, such as an IP-address of the base station 110 in the in the radio communications system 100, or a network therein, such as the core network.

Action 402

In response to the received request from the base station 110, the management entity 140 sends the listening request to every base station that potentially can be a neighbouring base station, for example to every base station 120-1, 120-2, 120-n, 120, within the boundary 114, as discussed above. This may be necessary to surely reach the neighbouring base station 110 since the management entity 140 is typically aware of the location of base stations in the radio communications system 100 and can send information to each one, but typically do not know which ones are neighbouring each other in the sense of having overlapping radio coverage.

Also, following the command in Action 401 to deliver a base station identifier together with the listening request, the base station identifier is sent together with the listening request.

Action 403

The base stations 120-1, 120-2, 120-n, 120, including the neighbouring base station 120, which receive the listening request, start to listen for the identification requesting message in order to be able to react appropriately if receiving it. The listening request may comprise information that determines what will be the identification requesting message, whereby a particular message may have a function of, or be interpreted as, an identification requesting message by the neighbouring base station 120 only after receipt of the listening request. This makes it possible to, in principle, use any message that can be requested to be sent by the user equipment 130 and that is receivable by the other base stations 120-1, 120-2, 120-n, 120 as the identification requesting message. For such embodiments it may be possible to use already existing user equipment without modification. For example, in LTE-based systems, sounding channel signaling may be requested to be sent and utilized as the identification requesting message. In such case the listening request may comprise information identifying which particular sounding channel message that will be the identification requesting message. It should be noted that also other signals can be used for this purpose, also in LTE-based systems.

Action 404

This action, where the base station 110 sends a request to the user equipment 130, corresponds to Action 301 accounted for above.

Action 405

In response to the received request, the user equipment 130 sends and the neighbouring base station 120 receives the identification requesting message. This action corresponds to Action 302 accounted for above, but with the addition that the neighbouring base station 110 responds to the identification requesting message, or even may be able to identify such message, only because it was requested to listen for it in Action 403 above.

Action 406

This action corresponds to Action 303 described above. Here, in response to receipt of the identification requesting message, the neighbouring base station 120 uses the base station identifier received in Action 402 above to send a neighbouring base station identifier to the base station 110.

When the base station identifier, as in this case, comprises an identity code that as such can be used to send information to the base station 110, for example that the identity code is an address, such as an IP-address of the base station 110 in the radio communications system 100, the neighbouring base station 120 can address the base station 110 in the radio communications system 100 without the need of involving the user equipment 130. Advantages with this is that less signaling is required, and in particular that less wireless signaling involving the user equipment 130 is required.

The neighbouring base station identifier may be such as discussed above under Action 303, however, in the following it is assumed that also the neighbouring base station identifier comprises an identity code that as such can be used to send information, for example that the identity code is an address, such as an IP-address of the neighbouring base station 120 in the radio communications system 100. Such neighbouring base station identifier may be sent comprised in a connection request using the base station identifier. In an LTE-based system, the neighbouring base station identifier comprising an identity code in the form of an IP-address of the neighbouring base station may be sent to the base station 110 as part of an X2 connection request from the neighbouring base station 120.

Action 407

This action, where the base station 110 uses the received neighbouring base station identifier to send information to the neighbouring base station 120, corresponds to Action 304 accounted for above.

If the neighbouring base station identifier in Action 406 was sent to the base station 110 as an X2 connection request from the neighbouring base station 120, the information being sent in the present action may comprise a an X2 connection accept resulting in an established connection over which additional information then can be sent to the neighbouring base station 120.

Figure 6:
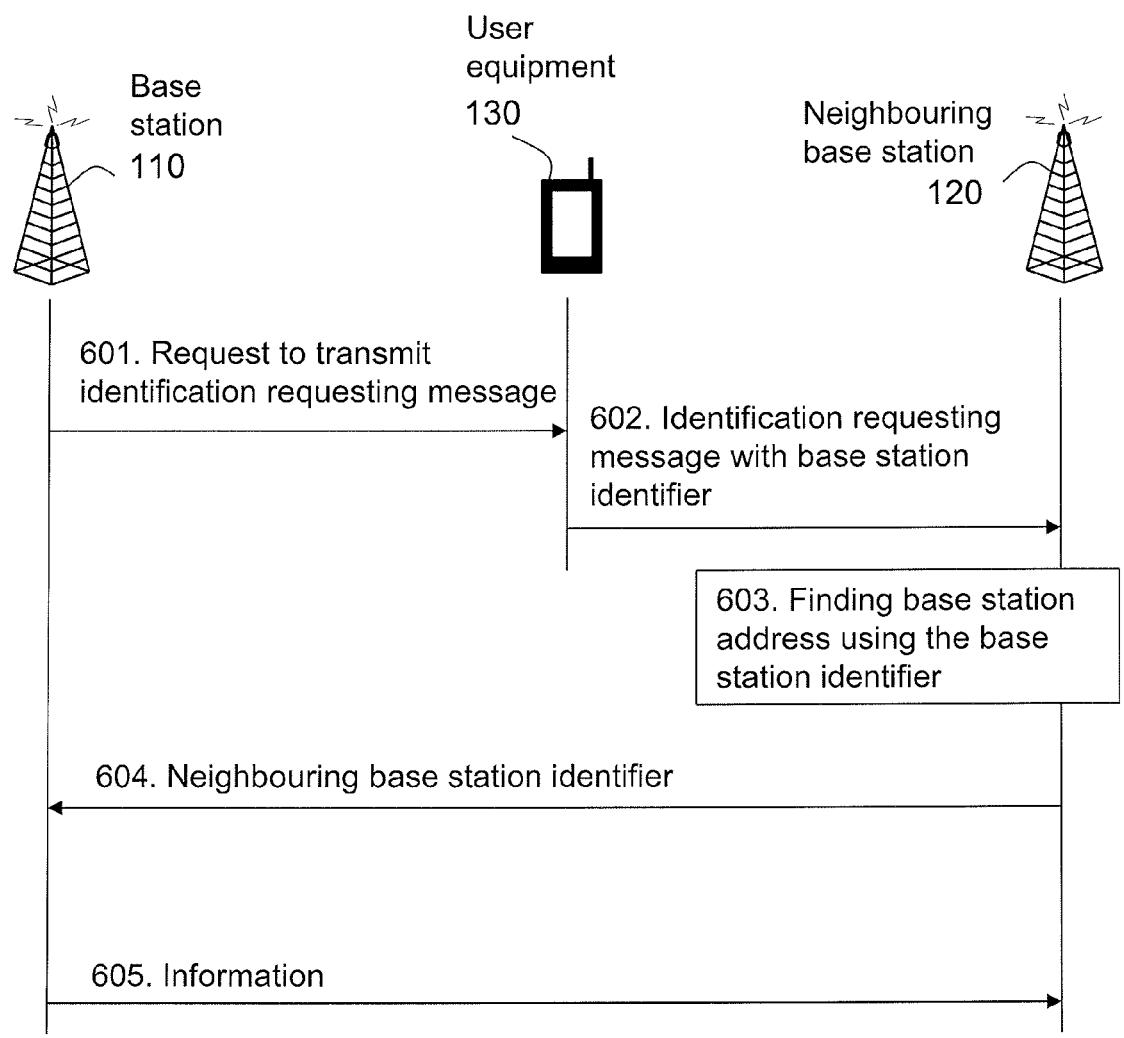
FIG. 6 is a combined signalling scheme and flowchart depicting embodiments in further detail according to a second type.

Embodiments herein for enabling a base station 110 to send information to the neighbouring base station 120, according to a second type of embodiments will now be described with reference to the combined signaling diagram and flowchart depicted in FIG. 6. The second type of embodiments may be viewed upon as a somewhat more detailed embodiments than described above in connection with the general type of embodiments and FIG. 2. As will be realized there are also similarities with the first type of embodiments. In the following focus will primarily be on information that differs from what have already been discussed.

Action 601

This action, where the base station 110 sends a request to the user equipment 130, corresponds to Action 301 accounted for above, with the addition that the request here, explicitly or implicitly, also commands the user equipment 130 to send a base station identifier together with the identification requesting message. The base station identifier may be such as discussed above under Action 303 and may be sent from the base station 110 together with the request, or it may be retrieved by the user equipment 130 in response to the request. The user equipment may already be aware of the base station identifier or information that can be used to retrieve or form the base station identifier, since the user equipment is currently served by the base station 100.

Action 602

This action, where the user equipment 130 in response to the received request sends and the neighbouring base station 120 receives the identification requesting message, corresponds to action 302 accounted for above. However, here the base station identifier is additionally sent together with the identification requesting message, which is in response to the command in Action 601. In the following it will be assumed that the base station identifier comprises an identity code that is globally unique, that is, of the type previously mentioned that as such cannot be used to send information but can be used to look-up an address in the radio communications system 100, or network therein. This may be advantageous in order to preserve integrity of the radio communications system 100, since the base station identifier is sent using the user equipment 130, and thus is sent over a wireless connection.

Action 603

To be able to send the neighbouring base station identifier to the base station 110, the neighbouring base station 120 uses the globally unique identity code of the base station identifier to find another identity code that as such can be used to send information, for example an address, such as an IP-address of the base station 110 in the radio communications system 100, or network therein. The address may be looked up in a database accessible by base stations in the radio communications system 100.

Action 604

This action corresponds to Action 303 described above. Here, after finding of the information in the preceding action, a neighbouring base station identifier is sent to the base station 110 in a corresponding manner as was described in connection with Action 406 above.

The neighbouring base station identifier may be such as discussed above under Action 303, however, in the following it is, similarly as in Action 406, assumed that the neighbouring base station identifier comprises an identity code that as such can be used to send information, for example that the identity code is an address, such as an IP-address of the neighbouring base station 120 in the radio communications system 100.

Action 605

This action, where the base station 110 sends a request to the user equipment 130, corresponds to Action 304 described above.

Figure 7:
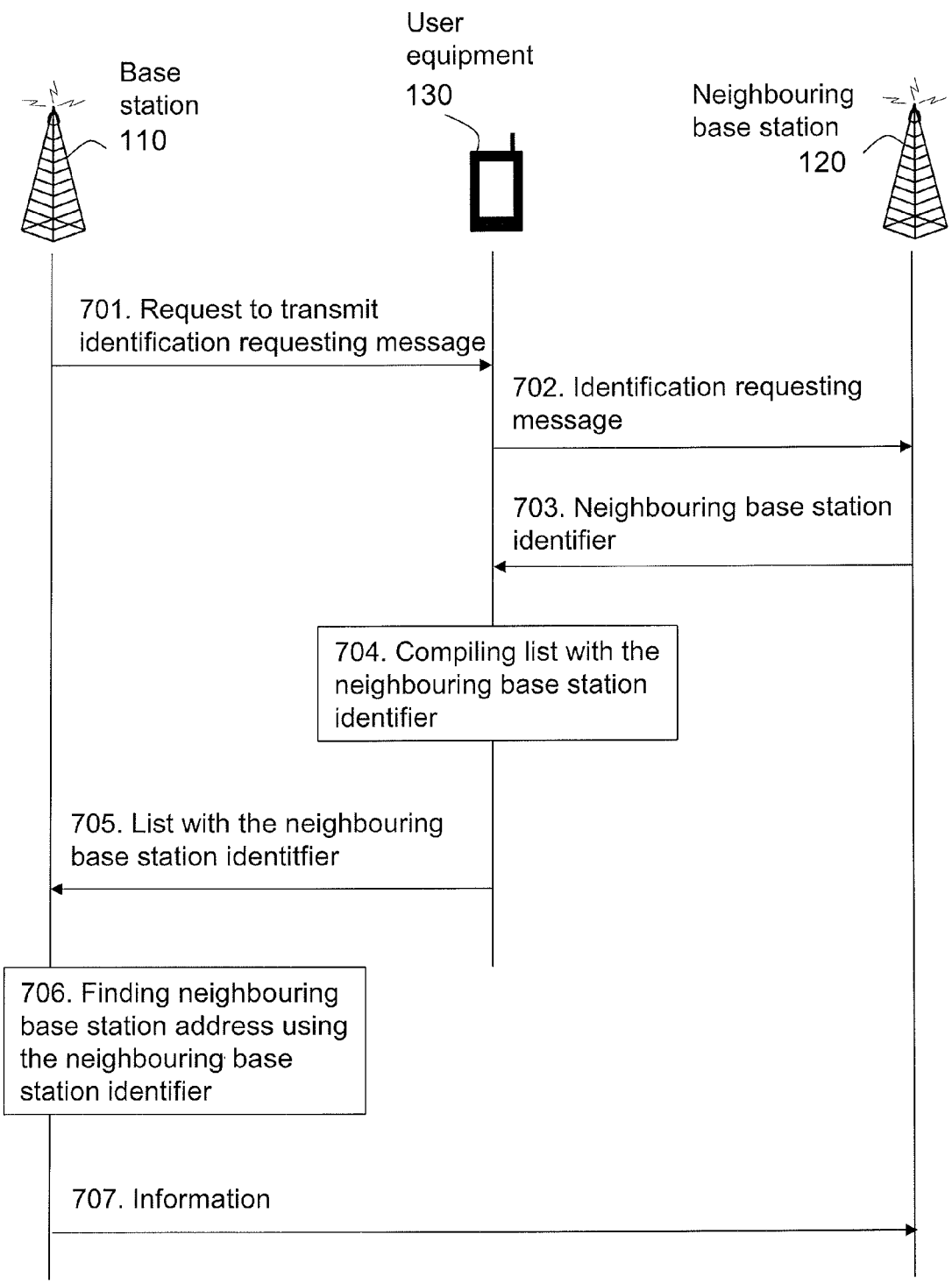
FIG. 7 is a combined signalling scheme and flowchart depicting embodiments in further detail according to a third type.

Embodiments herein for enabling a base station 110 to send information to the neighbouring base station 120, according to a third type of embodiments will now be described with reference to the combined signaling diagram and flowchart depicted in FIG. 7. The third type of embodiments can be viewed upon as somewhat more detailed embodiments than described above in connection with the general type of embodiments and FIG. 3. As will be realized there are also similarities with the first and second type of embodiments. In the following focus will primarily be on information that differs from what have already been discussed.

Action 701

This action, where the base station 110 sends a request to the user equipment 130, corresponds to Action 301 described above.

Action 702

This action, where the user equipment 130 in response to the received request sends and the neighbouring base station 120 receives the identification requesting message, corresponds to action 302 accounted for above.

Action 703

This action together with subsequent Actions 704-705 correspond to Action 303 described above, in the situation where the neighbouring base station identifier is sent via the user equipment 130. Here, in contrast to the first and second type of embodiments, no base station identifier is available and the neighbouring base station 120 responds to the identification requesting message from the user equipment 130 by sending back a neighbouring base station identifier to the user equipment 130.

The neighbouring base station identifier may be such as discussed above under Action 303, however, in the following it will be assumed that the base station identifier comprises an identity code that is globally unique, that is, of the type mentioned that as such cannot be used to send information but can be used to look-up an address in the radio communications system 100. Similar as was the case when the base station identifier in Action 602 above was sent wirelessly using the user equipment 130, this is may be advantageous in order to preserve integrity of the radio communications system 100.

Action 704

This action together with the preceding Action 703 and subsequent Action 705 correspond to Action 303 described above, in the situation where the neighbouring base station identifier is sent via the user equipment 130. The user equipment 130 here compiles a list with the neighbouring base station identifier together with other neighbouring base station identifiers if such have been received from other neighbouring base stations responding to the identification requesting message.

In some embodiments the user equipment 130 may have been provided with information, for example together with the request from the base station 110 in Action 701, that comprises identifiers of neighbouring base stations that are already known by the base station 110. The user equipment may then use this information to exclude already known neighbouring base stations when compiling the list. This reduces signaling of unnecessary information in subsequent actions.

Action 705

This action together with preceding Actions 703-704 correspond to Action 303 described above, in the situation where the neighbouring base station identifier is sent via the user equipment 130. Here the user equipment 130 sends, and the base station 110 receives, the compiled list with the neighbouring base station identifier.

Action 706

Since the neighbouring base station identifier here is of the type that as such cannot be used to send information to neighbouring base station 120, the base station 110 uses the globally unique identity code of the neighbouring base station identifier to find another identity code that as such can be used to send information, for example an address, such as an IP-address of the neighbouring base station 120 in the radio communications system 100. The address may be looked up in a database accessible by base stations in the radio communications system 100.

Action 707

This action, where the base station 110 uses the found identity code of the foregoing action to send information to the neighbouring base station 120, corresponds to Action 304 accounted for above. Here the information sent, at least to begin with, may be a connection request. In an LTE-based system, the connection request may be an X2 connection request.

It should be noted that in other embodiments employing a management entity 140 as discussed above in connection with the first type of embodiments, the base station identifier may instead be delivered with the identification requesting message, for example as discussed above in connection with the second type of embodiments. In yet other embodiments employing a management entity 140 as discussed above in connection with the first type of embodiments, there may be no base station identifier used at all, instead the neighbouring base station identifier may be delivered to the base station 110 via the user equipment 130, for example as discussed above in connection with the third type of embodiments.

What to trigger the base station 110 to send out the request to the user equipment 130, which request commands the user equipment 130 to send the identification requesting message, will now be discussed. What to trigger the base station 110 is what starts execution of Actions 301, 401, 601 and 701 discussed above and may be any one or more of the following: deployment of a new base station in the radio communications system 100, roll-out of the radio communications system 100, a predetermined time interval, at random time instances, when handover measurements are requested by the user equipment 130, for example when the serving signal quality reaches a minimum defined threshold, reaching of a threshold related to statistics on mobility performance in the radio communications system 100, receipt in the neighbouring base station 120 of an uplink handover measurement signal that is related to but not coordinated with the base station 110. The request may further be sent out periodically to capture changes in the network, e.g., seasonal or occasional pathloss variations (due to for example foliage or logging).

When statistics on mobility performance in the radio communications system 100 are used as a trigger, this may be radio link failure rate as this may indicate that some neighboring relations are missing.

What user equipment 130, in case of many available, to select for receiving the request from the base statin 110, that is, what user equipment 130 to select for sending the identification requesting message to the neighbouring base station 120, may be based on a position of the user equipment 130 in the cell 112 of the base station 110. The user equipment 130 may be selected as part of a subset of other user equipment of the many available, so that the location of the user equipment 130 together with locations of the other user equipment in the subset are spread out in the coverage area of the base station. Is some embodiments the user equipment 130 is selected randomly among available mobile equipment, or as a result from that all available mobile equipment are being selected for transmittal of the identification requesting message.

Figure 8:
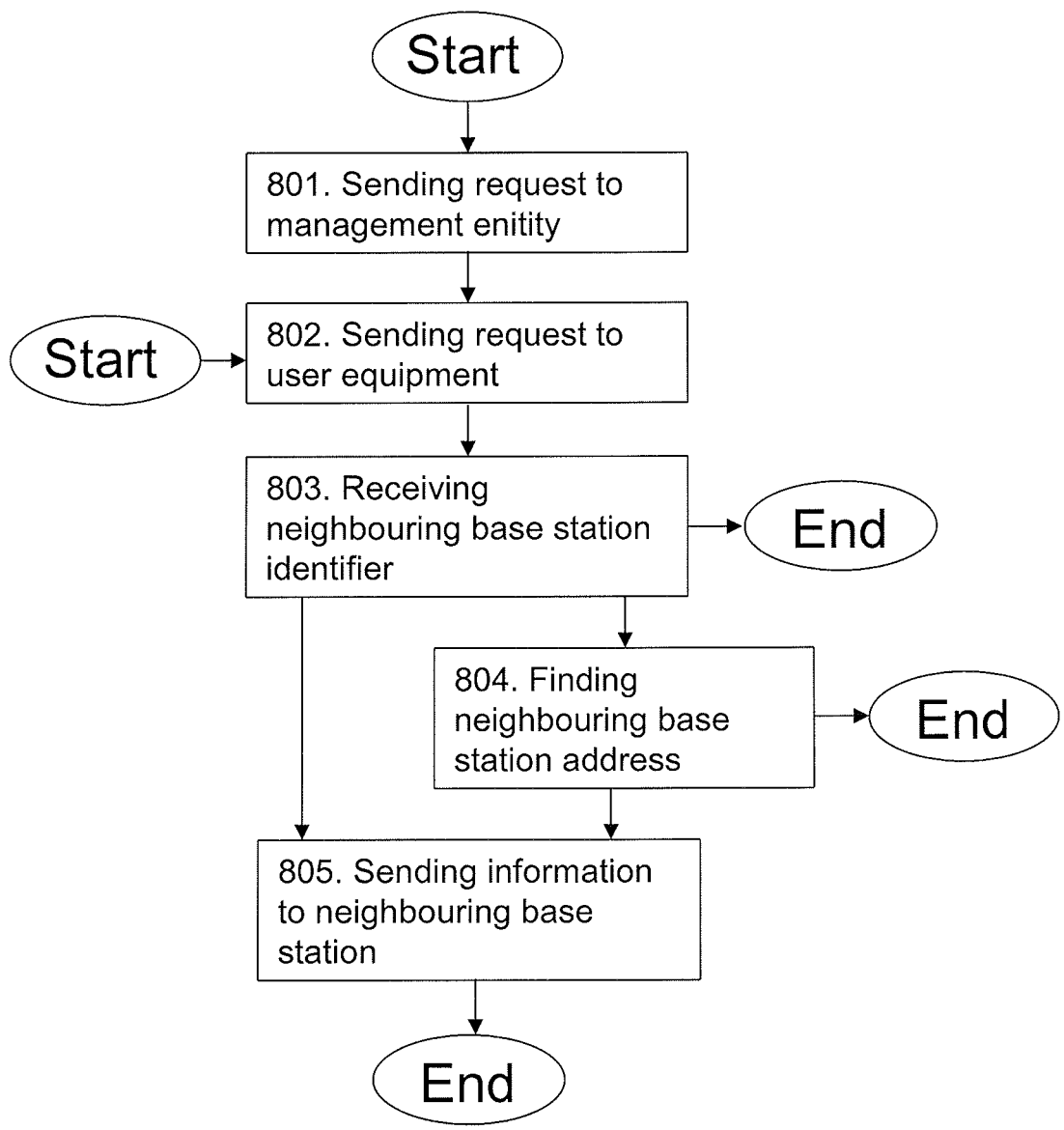
FIG. 8 is a flow chart illustrating embodiments of a method in a base station.

Embodiments herein relating to a method in the base station 110 for enabling the base station 110 to identify the neighbouring base station 120 will now be further elaborated and described with reference to the flowchart depicted in FIG. 8. As mentioned above, the base station 110 and the neighbouring base station 120 are comprised in the radio communications system 100. The radio communications system 100 also comprises the user equipment 130 and may comprise the management entity 140. The base station 110, the neighbouring base station 120, the user equipment 130, the management entity 140 and the radio communications system 100 may be any one of the in relation to FIG. 2 described types. The method comprises the following actions, which actions may be taken in any suitable order.

In action 801, which is an optional action, the base station 110 sends a request to the management entity 140 of the radio communications system 100. The request commands the management entity 140 to send a listening request to potential neighbouring base stations 120, 120-1 . . . 120-$n$ including the neighbouring base station 120. The listening request commands the potential neighbouring base stations 120, 120-1 . . . 120-$n$ to listen for the identification requesting message.

In some embodiments, the listening request comprises a base station identifier that is associated with and identifies the base station 110, thereby enabling the neighbouring base station 120 to identify the base station 110.

This action may correspond fully or partially to the previously described action 401.

In action 802, the base station 110 sends to the user equipment 130, a request that commands the user equipment 130 to send an identification requesting message to the neighbouring base station 120.

In some embodiments, the identification requesting message comprises a base station identifier that is associated with and identifies the base station 110, thereby enabling the neighbouring base station 120 to contact the base station 110.

In some embodiments, the neighbouring base station identifier is comprised in a connection request from the neighbouring base station 120.

The neighbouring base station identifier may comprise an address of the neighbouring base station 120 in the radio communications system 100.

In some embodiments, the request to the user equipment 130 further commands the user equipment 130 to send the identification requesting message in a predetermined time interval.

In some embodiments the neighbouring base station identifier is received via the user equipment 130 and may be comprised in a list together with identifiers of other neighbouring base stations 120-1, 120-2 that have responded to the identification requesting message.

This action may correspond fully or partially to the previously described actions 301, 404, 601, and 701.

In action 803, the base station 110 receives from the neighbouring base station 120, in response to reception of the sent identification requesting message, a neighbouring base station identifier that is associated with and identifies the neighbouring base station 120, thereby enabling the base station 110 to identify the neighbouring base station.

This action may correspond fully or partially to the previously described actions 303, 406, 604, and 703-705.

In action 804, which is an optional action, the base station 110 finds, based on the neighbouring base station identifier, an address of the neighbouring base station 120 in the radio communications system (100).

This action may correspond fully or partially to the previously described action 706.

In action 805, which is an optional action, the base station 110 sends information to the neighbouring base station 120 using the received neighbouring base station identifier.

This action may correspond fully or partially to the previously described action 304, 407, 605, and 707.

In some embodiments, the base station identifier comprises an address of the base station 110 in the radio communications system 100.

Figure 9:
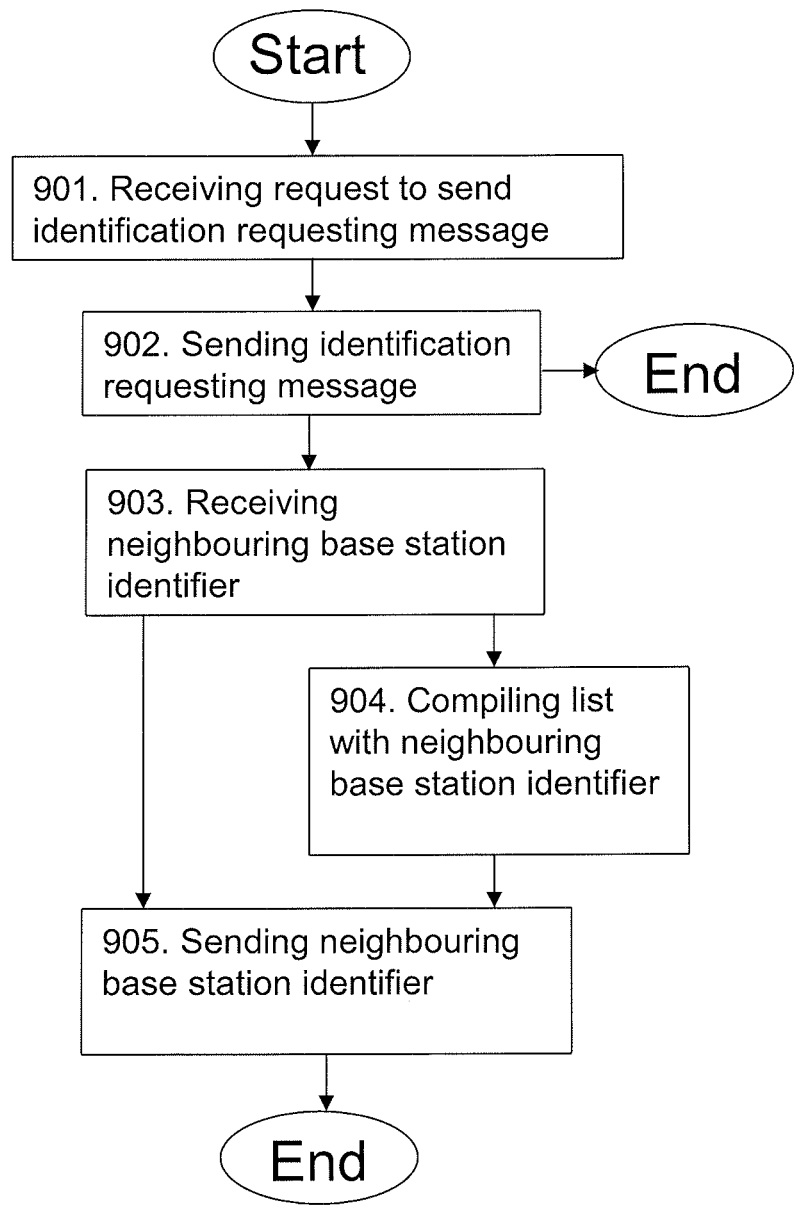
FIG. 9 is a flow chart illustrating embodiments of a method in a user equipment.

Embodiments herein relating to a method in the user equipment 130 for assisting in enabling the base station 110 to identify the neighbouring base station 120, will now be further elaborated and described with reference to the flowchart depicted in FIG. 9. As previously mentioned, the base station 110, the neighbouring base station 120 and the user equipment 130 are comprised in the radio communications system 100. The radio communications system 100 may also comprise the management entity 140. The base station 110, the neighbouring base station 120, the user equipment 130, the management entity 140 and the radio communications system 100 may be any one of the in relation to FIG. 2 described types. The method comprises the following actions, which actions may be taken in any suitable order.

In action 901, the user equipment 130 receives from the base station 110, a request that commands the user equipment 130 to send an identification requesting message to the neighbouring base station 120.

In some embodiments, the identification requesting message comprises a base station identifier that is associated with and identifies the base station 110, thereby enabling the neighbouring base station 120 to contact the base station 110.

In some embodiments, the identification requesting message is sent in a predetermined time interval.

This action may correspond fully or partially to the previously described actions 301, 404, 601 and 701.

In action 902, the user equipment 130 sends the identification requesting message to the neighbouring base station 120.

This action may correspond fully or partially to the previously described actions 302, 405, 602 and 702.

In action 903, which is an optional action, the user equipment 130 receives from the neighboring base station 120, in response to reception of the sent identification requesting message, a neighbouring base station identifier that is associated with and identifies the neighbouring base station 120.

This action may correspond fully or partially to the previously described action 703.

In action 904, which is an optional action, the user equipment 130 compiles a list with the neighbouring base station identifier together with identifiers of other neighbouring base stations that have responded to the identification requesting message.

This action may correspond fully or partially to the previously described action 704.

In action 905, which is an optional action, the user equipment 130 sends to the base station 110, the neighbouring base station identifier, thereby enabling the base station 110 to send information to the neighbouring base station 120. If action 904 has been performed, the neighbouring base station identifier is comprised in the compiled list when sent to the base station 110.

This action may correspond fully or partially to the previously described action 705.

Figure 10:
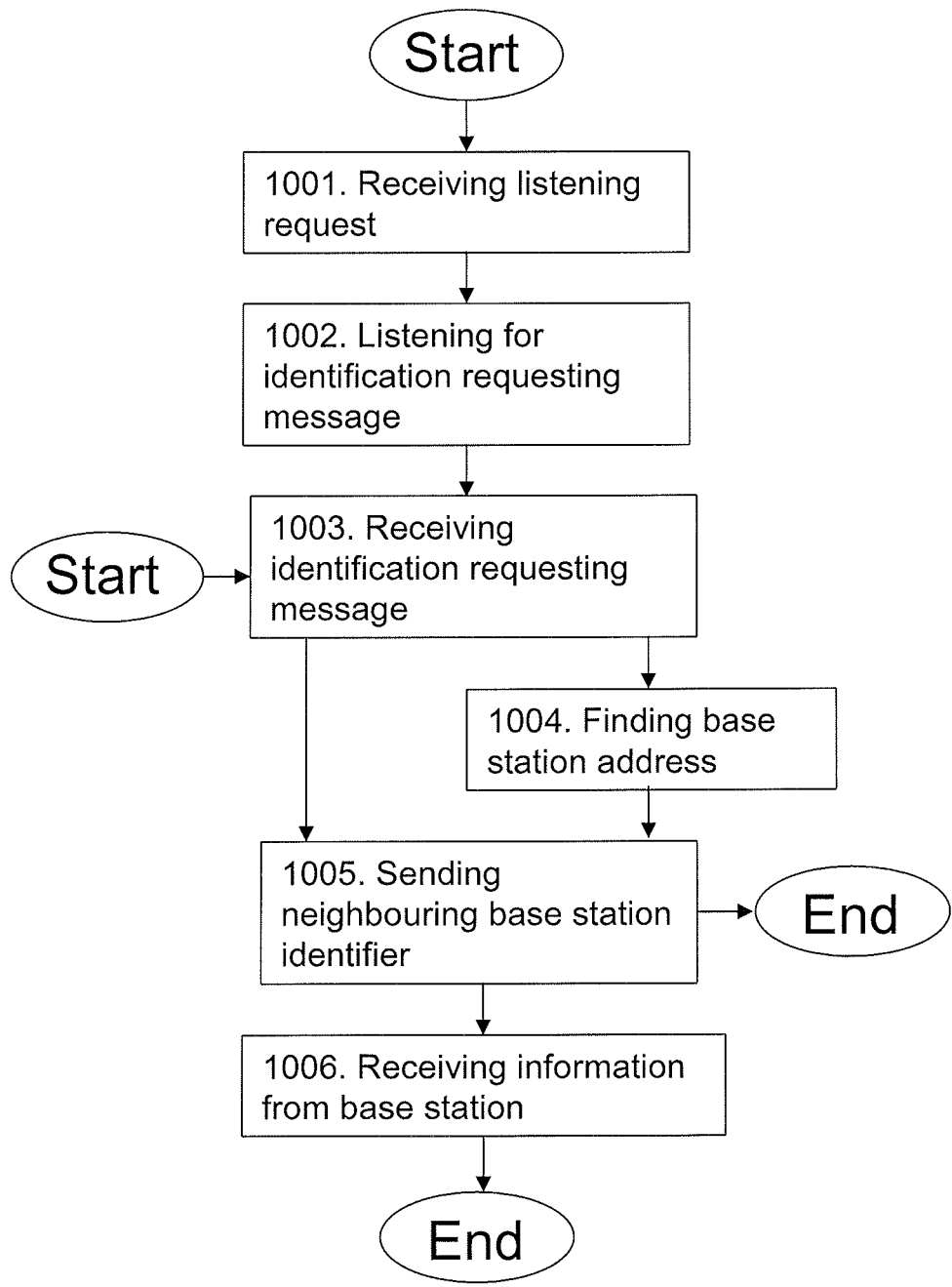
FIG. 10 is a flow chart illustrating embodiments of a method in a neighbouring base station.

Embodiments herein relating to a method in the neighbouring base station 120 for enabling the base station 110 to identify the neighbouring base station 120, will now be further elaborated and described with reference to the flowchart depicted in FIG. 10. As previously mentioned, the base station 110, the neighbouring base station 120 and the user equipment 130 are comprised in the radio communications system 100. As previously mentioned, the base station 110 and the neighbouring base station 120 are comprised in the radio communications system 100. The radio communications system 100 also comprises the user equipment 130 and may comprise the management entity 140. The base station 110, the neighbouring base station 120, the user equipment 130, the management entity 140 and the radio communications system 100 may be any one of the in relation to FIG. 2 described types. The method comprises the following actions, which actions may be taken in any suitable order.

In action 1001, which is an optional action, the neighbouring base station 120 receives from the management entity 140 of the radio communications system 100, a listening request that commands the neighbouring base station 120 to listen for the identification requesting message.

In some embodiments, the listening request comprises a base station identifier that is associated with and identifies the base station 110, thereby enabling the neighbouring base station 120 to contact the base station 110.

This action may correspond fully or partially to the previously described action 402.

In action 1002, which is an optional action, the neighbouring base station 120 listens for the identification requesting message.

This action may correspond fully or partially to the previously described action 403.

In action 1003, the neighbouring base station 120 receives from the user equipment 130, an identification requesting message.

In some embodiments, the identification requesting message comprises a base station identifier that is associated with and identifies the base station 110, thereby enabling the neighbouring base station 120 to contact the base station 110.

This action may correspond fully or partially to the previously described actions 302, 405, 602, and 702.

In action 1004, which is an optional action, the neighbouring base station 120 finds, based on base station identifier, an address of the base station 110 in the radio communications system 100.

This action may correspond fully or partially to the previously described action 603.

In action 1005, the neighbouring base station 120 sends to the base station 110, in response to reception of the identification requesting message, a neighbouring base station identifier that is associated with and identifies the neighbouring base station 120, thereby enabling the base station 110 to identify the neighbouring base station 120.

In some embodiments, the neighbouring base station identifier is being sent to the base station 110 comprised in a connection request.

In some embodiments, the neighbouring base station identifier is being sent to the base station 110 via the user equipment 130.

This action may correspond fully or partially to the previously described actions 303, 406, 604, and 703-705.

In action 1006, which is an optional action, the neighbouring base station 120 receives information from the base station 110 that have used the received neighbouring base station identifier to send this information.

This action may correspond fully or partially to the previously described actions 304, 407, 605, and 707.

Figure 11:
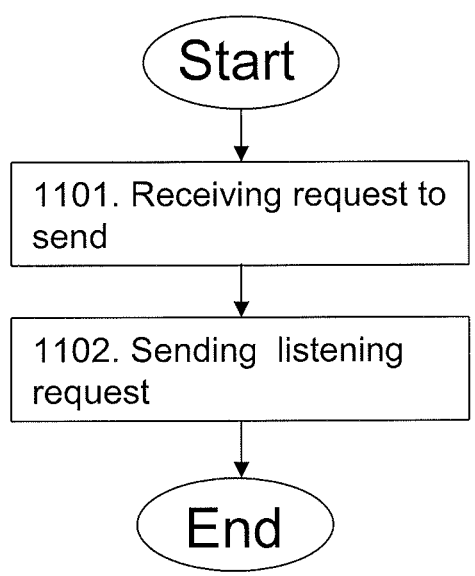
FIG. 11 is a flow chart illustrating embodiments of a method in a management entity.

Embodiments herein relating to a method in the management entity 140 for assisting in enabling the base station 110 to identify the neighbouring base station 120, will now be further elaborated and described with reference to the flowchart depicted in FIG. 11. The base station 110, the neighbouring base station 120, the user equipment 130 and the management entity 140 are comprised in the radio communications system 100 together with the potential neighbouring base stations 120, 120-1 . . . 120-n including the neighbouring base station 120. The base station 110, the neighbouring base station 120, the potential neighbouring base stations 120, 120-1 . . . 120-n, the user equipment 130, the management entity 140 and the radio communications system 100 may be any one of the in relation to FIG. 2 described types. The method comprises the following actions, which actions may be taken in any suitable order.

In action 1101, the management entity 140, receives from the base station 100, a request that commands the management entity 140 to send a listening request to the potential neighbouring base stations 120, 120-1 . . . 120-n including the neighbouring base station 120, which listening request commands the potential neighbouring base stations 120, 120-1 . . . 120-n to listen for an identification requesting message.

This action may correspond fully or partially to the previously described action 401.

In action 1102, the management entity 140 sends the listening request to the potential neighbouring base stations 120, 120-1 . . . 120-n.

In some embodiments, the listening request comprises a base station identifier that is associated with and identifies the base station 110, thereby enabling the neighbouring base station 120 to contact the base station 110.

This action may correspond fully or partially to the previously described action 402.

Figure 12:
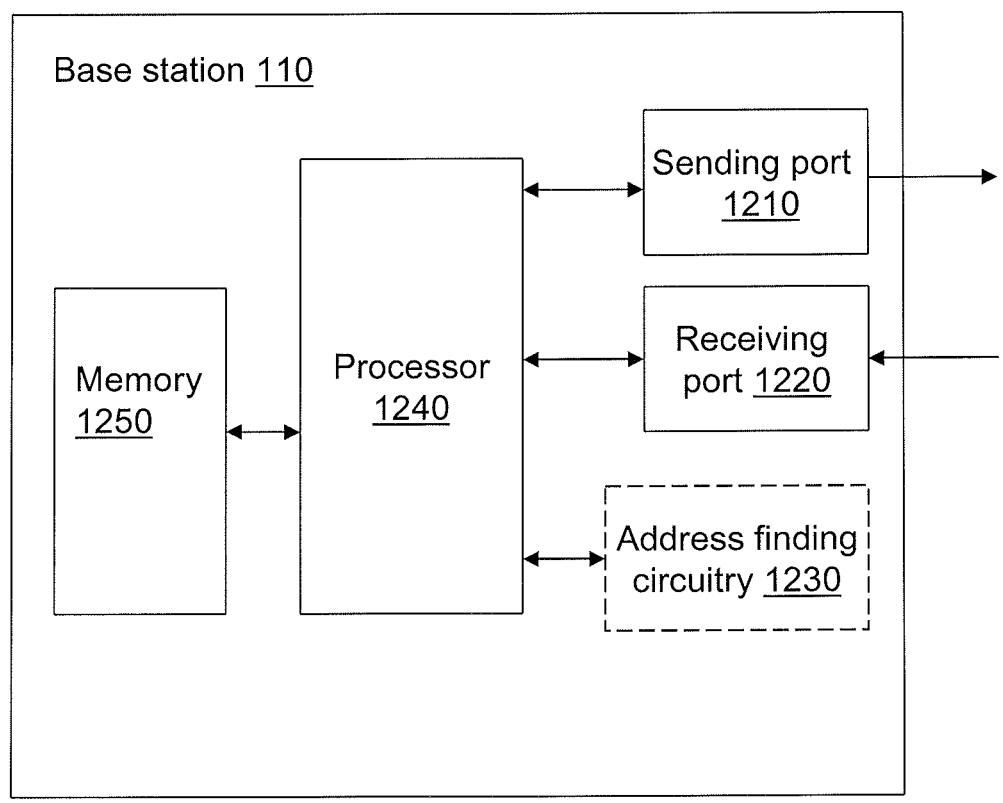
FIG. 12 is a schematic block diagram showing embodiments of a base station.

To perform the actions above for enabling the base station 110 to identify the neighbouring base station 120, the base station 110 comprises an arrangement schematically depicted in FIG. 12. The base station 110 and the neighbouring base station 120 are comprised in the radio communications system 100. The radio communications system 100 also comprises the user equipment 130 and may comprise the management entity 140. The base station 110, the neighbouring base station 120, the user equipment 130, the management entity 140 and the radio communications system 100 may be any one of the in relation to FIG. 2 described types.

The base station 110 comprises a sending port 1210. The sending port 1210 is configured to send to the user equipment 130, a request that commands the user equipment 130 to send an identification requesting message to the neighbouring base station 120, described above in relation to FIG. 8.

The sending port 1210 may further be configured to send to the management entity 140 of the radio communications system 100, a request that commands the management entity 140 to send a listening request to potential neighbouring base stations 120, 120-1 . . . 120-n including the neighbouring base station 120, which listening request commands the potential neighbouring base stations 120, 120-1 . . . 120-n to listen for the identification requesting message.

The sending port 1210 may further be configured to send information to the neighbouring base station 120 using a received neighbouring base station identifier.

The listening request may comprise a base station identifier that is associated with and identifies the base station 110, thereby enabling the neighbouring base station 120 to contact the base station 110.

The identification requesting message may comprises a base station identifier that is associated with and identifies the base station 110, thereby enabling the neighbouring base station 120 to contact the base station 110.

The base station identifier may comprise an address of the base station 110 in the radio communications system 100.

The neighbouring base station identifier may be comprised in a connection request from the neighbouring base station 120.

The neighbouring base station identifier may comprise an address of the neighbouring base station 120 in the radio communications system 100.

The request to the user equipment 130 may further command the user equipment 130 to send the identification requesting message in a predetermined time interval.

The neighbouring base station identifier may be received via the user equipment 130 and may be comprised in a list together with identifiers of other neighbouring base stations 120-1, 120-2 that have responded to the identification requesting message.

The base station 110 further comprises a receiving port 1220. The receiving port 1220 is configured to receive from the neighbouring base station 120, in response to reception of the sent identification requesting message, a neighbouring base station identifier that is associated with and identifies the neighbouring base station 120, thereby enabling the base station 110 to identify the neighbouring base station.

The base station 110 may further comprise an address finding circuitry 1230. The address finding circuitry 1230 is configured to find, based on the neighbouring base station identifier, an address of the neighbouring base station 120 in the radio communications system 100.

The embodiments of the base station 110 may be implemented through one or more processors, such as a processor 1240 in the base station 110 depicted in FIG. 12, together with computer program code for performing the functions and actions of embodiments herein.

The program code mentioned above may also be provided as a computer program product, for instance in the form of a data carrier carrying computer program code for performing the embodiments herein when being loaded into the in the base station 110. One such carrier may be in the form of a CD ROM disc. It is however feasible with other data carriers such as a memory stick or memory card. The computer program code may furthermore be provided as pure program code on a server and downloaded to the base station 110.

The base station 110 may further comprise a memory 1250 comprising one or more memory units. The memory 1250 is arranged to be used to store data, received identifiers, lists, contact information to other nodes in the radio communications system 100, information on established connections with other base stations, configurations and applications to perform the methods herein when being executed in the base station 110.

Those skilled in the art will also appreciate that the sending port 1210, the receiving port 1220 and the address finding circuitry 1230 described above may refer to a combination of analog and digital circuits, and/or one or more processors configured with software and/or firmware (e.g., stored in memory) that, when executed by the one or more processors such as the processor 1240, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 13:
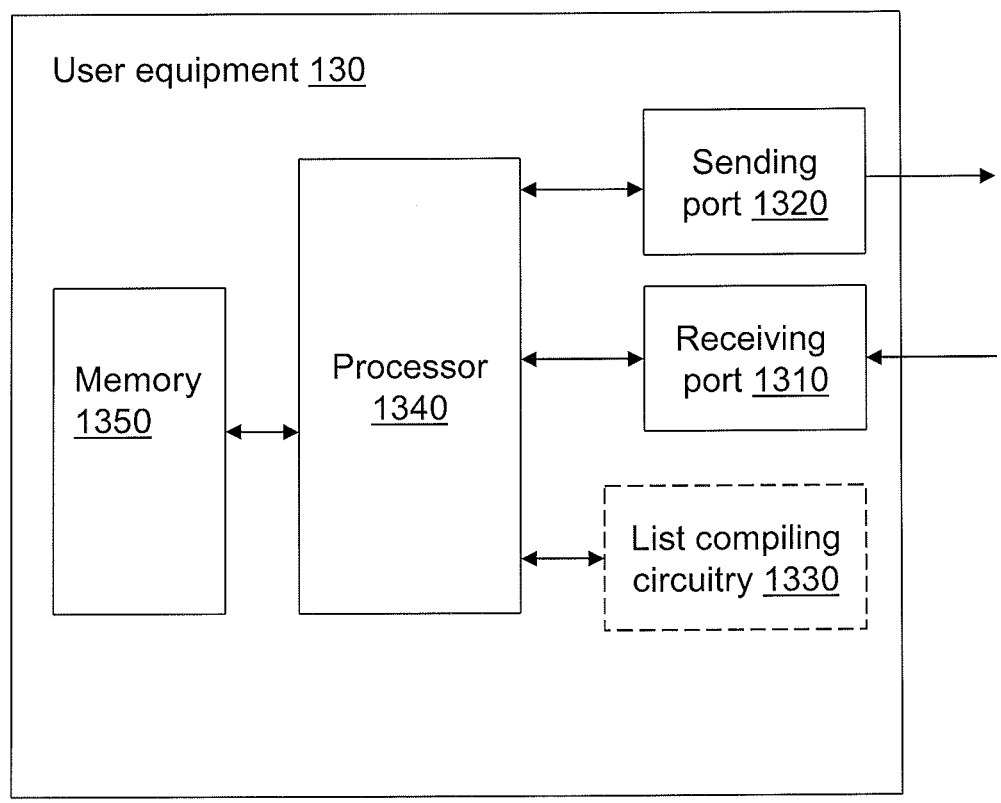
FIG. 13 is a schematic block diagram showing embodiments of a user equipment.

To perform the actions above for assisting in enabling the base station 110 to identify the neighbouring base station 120, the user equipment 130 comprises an arrangement schematically depicted in FIG. 13. The base station 110 and the neighbouring base station 120 are comprised in the radio communications system 100. The radio communications system 100 also comprises the user equipment 130 and may comprise the management entity 140. The base station 110, the neighbouring base station 120, the user equipment 130, the management entity 140 and the radio communications system 100 may be any one of the in relation to FIG. 2 described types.

The user equipment 130 comprises a receiving port 1310. The receiving port 1310 is configured to receive from the base station 110, a request that commands the user equipment 130 to send an identification requesting message to the neighbouring base station 120.

The identification requesting message may comprises a base station identifier that is associated with and identifies the base station 110, thereby enabling the neighbouring base station 120 to contact the base station 110.

The receiving port 1320 may be further configured to receive from the neighboring base station 120, in response to reception of the sent identification requesting message, a neighbouring base station identifier that is associated with and identifies the neighbouring base station 120.

The user equipment 130 further comprises a sending port 1320. The sending port 1310 is configured to send the identification requesting message to the neighbouring base station 120.

The sending port 1320 may be further configured to send the identification requesting message in a predetermined time interval.

In some embodiments the sending port is further configured to send the neighbouring base station identifier to the base station 110, thereby enabling the base station 110 to identify the neighbouring base station 120.

The user equipment 130 may further comprise a list compiling circuitry 1330. The list compiling circuitry 1330 is configured to compile a list with the neighbouring base station identifier together with identifiers of other neighbouring base stations 120-1, 120-2 that have responded to the identification requesting message, wherein the neighbouring base station identifier is to be sent comprised in the list to the base station 110.

The embodiments of the user equipment 130 may be implemented through one or more processors, such as a processor 1340 in the user equipment 130 depicted in FIG. 13, together with computer program code for performing the functions and actions of embodiments herein.

The program code mentioned above may also be provided as a computer program product, for instance in the form of a data carrier carrying computer program code for performing the embodiments herein when being loaded into the user equipment 130. One such carrier may be in the form of a CD ROM disc. It is however feasible with other data carriers such as a memory stick or memory card. The computer program code may furthermore be provided as pure program code on a server and downloaded to the base station 110.

The base station 110 may further comprise a memory 1350 comprising one or more memory units. The memory 1350 is arranged to be used to store data, received identifiers, lists, contact information to other nodes in the radio communications system, configurations and applications to perform the methods herein when being executed in the user equipment 130.

Those skilled in the art will also appreciate that the receiving port 1310, the sending port 1320 and the list compiling circuitry 1330 described above may refer to a combination of analog and digital circuits, and/or one or more processors configured with software and/or firmware (e.g., stored in memory) that, when executed by the one or more processors such as the processor 1340, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 14:
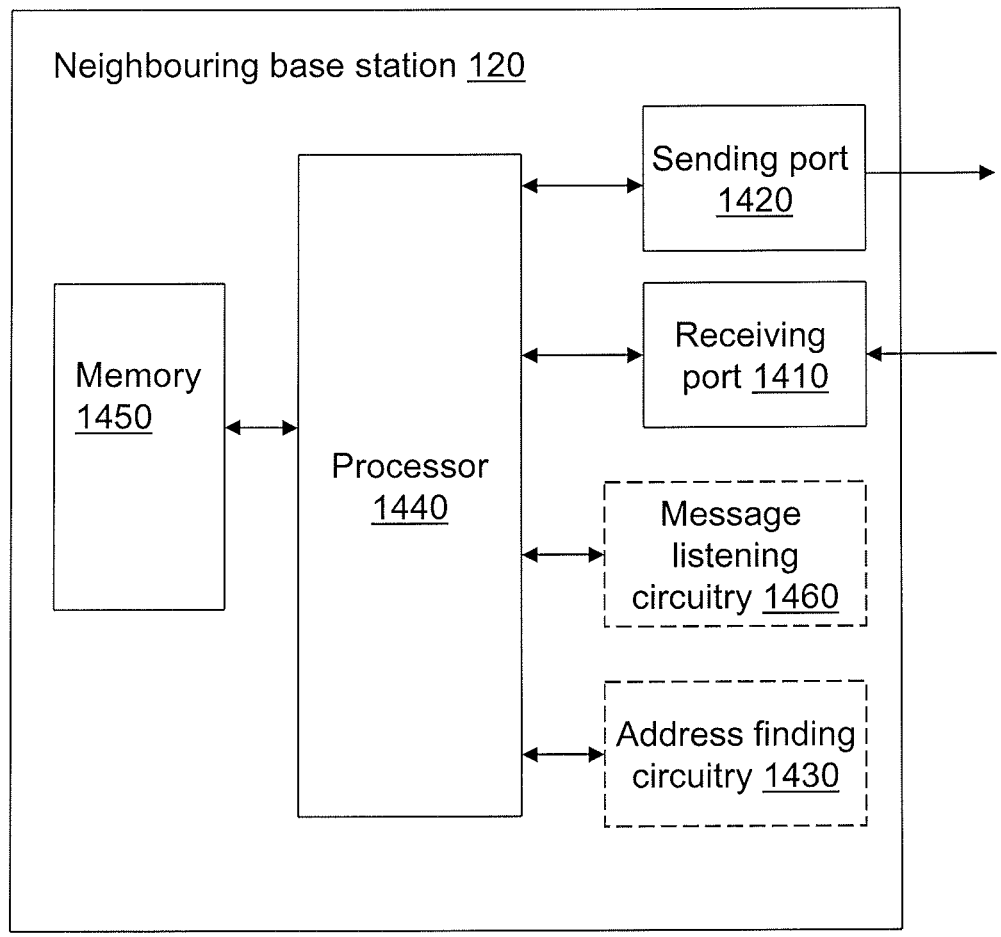
FIG. 14 is a schematic block diagram showing embodiments of a neighbouring base station.

To perform the actions above for enabling the base station 110 to identify the neighbouring base station 120, the neighbouring base station 120 comprises an arrangement schematically depicted in FIG. 14. The base station 110 and the neighbouring base station 120 are comprised in the radio communications system 100. The radio communications system 100 also comprises the user equipment 130 and may comprise the management entity 140. The base station 110, the neighbouring base station 120, the user equipment 130, the management entity 140 and the radio communications system 100 may be any one of the in relation to FIG. 2 described types.

The neighbouring base station 110 comprises a receiving port 1410. The receiving port 1410 is configured to receive from the user equipment 130, an identification requesting message.

The receiving port 1410 may be further configured to receive from the management entity 140, a listening request that commands the neighbouring base station 120 to listen for the identification requesting message. The listening request may comprise a base station identifier that is associated with and identifies the base station 110, thereby enabling the neighbouring base station 120 to contact the base station (110).

The identification requesting message may comprises a base station identifier that is associated with and identifies the base station 110, thereby enabling the neighbouring base station 120 to contact the base station 110.

The neighbouring base station 110 further comprises a sending port 1420. The sending port 1420 is configured to send to the base station 110, in response to reception of the identification requesting message, a neighbouring base station identifier that is associated with and identifies the neighbouring base station 120, thereby enabling the base station (110) to identify the neighbouring base station 120.

The sending port 1420 may be further configured to send the neighbouring base station identifier comprised in a connection request to the base station 110.

In some embodiments the sending port 1420 is further configured to send the neighbouring base station identifier to the base station 110 via the user equipment 130.

The neighbouring base station 110 may further comprise a message listening circuitry 1260. The message listening circuitry 1260 is configured to listen for the identification requesting message.

The neighbouring base station 110 may further comprise an address finding circuitry 1230. The address finding circuitry 1230 is configured to find, based on the base station identifier, an address of the base station 110 in the radio communications system 100.

The embodiments of the neighbouring base station 120 may be implemented through one or more processors, such as a processor 1440 in the neighbouring base station 120 depicted in FIG. 14, together with computer program code for performing the functions and actions of embodiments herein.

The program code mentioned above may also be provided as a computer program product, for instance in the form of a data carrier carrying computer program code for performing the embodiments herein when being loaded into the in the neighbouring base station 120. One such carrier may be in the form of a CD ROM disc. It is however feasible with other data carriers such as a memory stick or memory card. The computer program code may furthermore be provided as pure program code on a server and downloaded to the neighbouring base station 120.

The neighbouring base station 110 may further comprise a memory 1450 comprising one or more memory units. The memory 1450 is arranged to be used to store data, received identifiers, lists, contact information to other nodes in the radio communications system 100, information on established connections with other base stations, configurations and applications to perform the methods herein when being executed in the neighbouring base station 110.

Those skilled in the art will also appreciate that the sending port 1420, the receiving port 1410, the message listening circuitry 1460 and the address finding circuitry 1430 described above may refer to a combination of analog and digital circuits, and/or one or more processors configured with software and/or firmware (e.g., stored in memory) that, when executed by the one or more processors such as the processor 1440, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

In practise, embodiments of the base station 110 and the embodiments of the neighbouring base station 120 may be implemented in one and the same base station. This since a base station that have a neighbouring base station also, consequently, itself will be a neighbouring base station to that base station, and should be able to act accordingly. As should be recognized, the practical circumstances may determine whether such base station will act as a base station 110 or neighbouring base station 120, as described in the foregoing.

Figure 15:
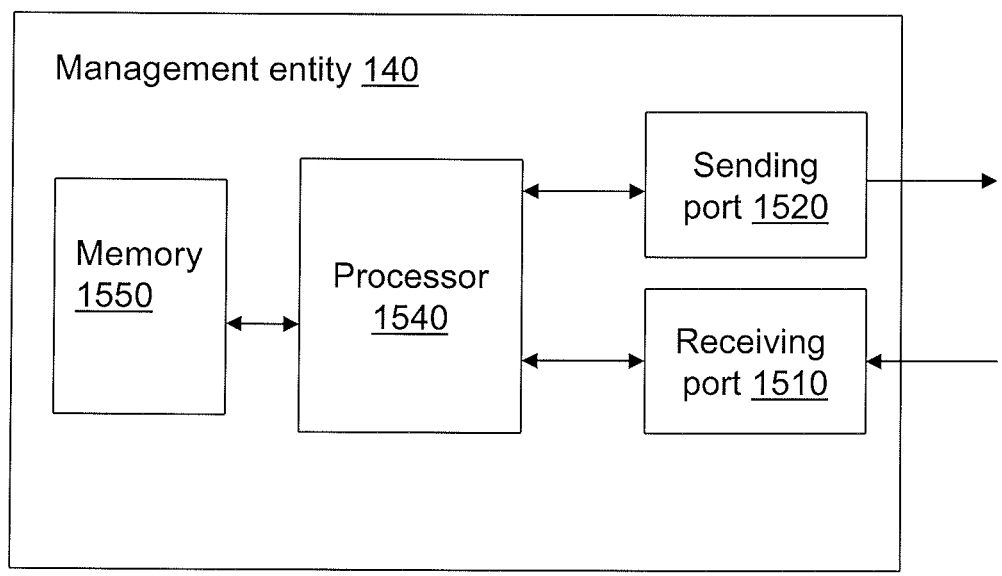
FIG. 15 is a schematic block diagram showing embodiments of a management entity.

To perform the actions above for assisting in enabling the base station 110 to identify the neighbouring base station 120, the management entity 140 comprises an arrangement schematically depicted in FIG. 15. The base station 110, the neighbouring base station 120 and the management entity 140 are comprised in the radio communications system 100. The base station 110, the neighbouring base station 120, the management entity 140 and the radio communications system 100 may be any one of the in relation to FIG. 2 described types.

The management entity 140 comprises a receiving port 1510. The receiving port 1510 is configured to receive from the base station 100, a request that commands the management entity 140 to send a listening request to potential neighbouring base stations 120, 120-1 . . . 120-n including the neighbouring base station 120, which listening request commands the potential neighbouring base stations 120, 120-1 . . . 120-n to listen for an identification requesting message.

The management entity 140 further comprises a sending port 1520. The sending port 1520 is configured to send the listening request to the potential neighbouring base stations 120, 120-1 . . . 120-n.

The listening request may comprise a base station identifier that is associated with and identifies the base station 110, thereby enabling the neighbouring base station 120 to contact the base station 110.

The embodiments of the management entity 140 may be implemented through one or more processors, such as a processor 1540 in the management entity 140 depicted in FIG. 15, together with computer program code for performing the functions and actions of embodiments herein.

The program code mentioned above may also be provided as a computer program product, for instance in the form of a data carrier carrying computer program code for performing the embodiments herein when being loaded into the in the management entity 140. One such carrier may be in the form of a CD ROM disc. It is however feasible with other data carriers such as a memory stick or memory card. The computer program code may furthermore be provided as pure program code on a server and downloaded to the management entity 140.

The management entity 140 may further comprise a memory 1550 comprising one or more memory units. The memory 1550 is arranged to be used to store data, received identifiers, lists, contact information to other nodes in the radio communications system 100, information on established connections with base stations, configurations and applications to perform the methods herein when being executed in the management entity 140.

Those skilled in the art will also appreciate that the sending port 1520 and the receiving port 1510 described above may refer to a combination of analog and digital circuits, and/or one or more processors configured with software and/or firmware (e.g., stored in memory) that, when executed by the one or more processors such as the processor 1540, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method, performed by a base station to identify a neighboring base station, the base station and the neighboring base station being in a radio communications system, the method comprising:
   sending a first request to a management entity, wherein the first request commands the management entity to send a listening request to potential neighboring base stations, including the neighboring base station, wherein the listening request commands the potential neighboring base stations to listen for an identification requesting message;
   sending a second request to a user equipment, wherein the second request commands the user equipment to send the identification requesting message, the identification requesting message comprising a base station identifier that is both associated with and identifies the base station, to the neighboring base station, the neighboring base station contacting the base station based on the base station identifier; and
   receiving from the neighboring base station, in response to reception of the sent identification requesting message, a neighboring base station identifier that is both associated with and identifies the neighboring base station, the base station identifying the neighboring base station based on the received neighboring base station identifier.

2. The method of claim 1, further comprising sending information to the neighboring base station using the received neighboring base station identifier.

3. The method of claim 1, wherein the listening request comprises the base station identifier that is both associated with and identifies the base station, the neighboring base station contacting the base station based on the base station identifier.

4. The method of claim 3, wherein the base station identifier comprises an address of the base station in the radio communications system.

5. The method of claim 1, wherein the neighboring base station identifier is comprised in a connection request from the neighboring base station.

6. The method of claim 1, wherein the neighboring base station identifier comprises an address of the neighboring base station in a network associated with the radio communications system.

7. The method of claim 1, further comprising finding, based on the neighboring base station identifier, an address of the neighboring base station in the radio communications system.

8. The method of claim 1, wherein the second request sent to the user equipment further commands the user equipment to send the identification requesting message in a predetermined time interval.

9. The method of claim 1, wherein the receiving the neighboring base station identifier comprises receiving the neighboring base station via the user equipment.

10. The method of claim 9, wherein the neighboring base station identifier is comprised in a list together with identifiers of other neighboring base stations that have responded to the identification requesting message.

11. A base station configured to identify a neighboring base station, the base station and the neighboring base station being in a radio communications system, the base station comprising:

a sending port configured to send a first request to a management entity, wherein the first request commands the management entity to send a listening request to potential neighboring base stations, including the neighboring base station, wherein the listening request commands the potential neighboring base stations to listen for an identification requesting message;

the sending port further configured to send a second request to a user equipment, wherein the second request commands the user equipment to send the identification requesting message, the identification requesting message comprising a base station identifier that is both associated with and identifies the base station, to the neighboring base station, the neighboring base station contacting the base station based on the base station identifier; and a receiving port configured to receive a response from the neighboring base station, in response to reception of the sent identification requesting message, the response comprising a neighboring base station identifier that is both associated with and identifies the neighboring base station, the base station identifying the neighboring base station based on the neighboring base station identifier.

* * * * *